United States Patent
Saber et al.

(10) Patent No.: US 12,402,127 B2
(45) Date of Patent: Aug. 26, 2025

(54) METHODS, SYSTEMS, AND DEVICES FOR SPS PDSCH RELEASE

(71) Applicant: Samsung Electronics Co., Ltd., Suwon-si (KR)

(72) Inventors: Hamid Saber, San Diego, CA (US); Jung Hyun Bae, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 552 days.

(21) Appl. No.: 17/525,838

(22) Filed: Nov. 12, 2021

(65) Prior Publication Data

US 2022/0174706 A1    Jun. 2, 2022

Related U.S. Application Data

(60) Provisional application No. 63/225,882, filed on Jul. 26, 2021, provisional application No. 63/142,589, filed on Jan. 28, 2021, provisional application No. 63/133,679, filed on Jan. 4, 2021, provisional application No. 63/117,886, filed on Nov. 24, 2020.

(51) Int. Cl.
| | |
|---|---|
| *H04W 72/20* | (2023.01) |
| *H04W 72/1273* | (2023.01) |
| *H04W 72/21* | (2023.01) |
| *H04W 72/23* | (2023.01) |

(52) U.S. Cl.
CPC ....... *H04W 72/1273* (2013.01); *H04W 72/21* (2023.01); *H04W 72/23* (2023.01)

(58) Field of Classification Search
CPC ............. H04W 72/20; H04W 72/1273; H04W 72/0446
See application file for complete search history.

(56) References Cited

U.S. PATENT DOCUMENTS

| | | |
|---|---|---|
| 10,772,117 B2 | 9/2020 | Yi et al. |
| 10,841,046 B2 | 11/2020 | Yang et al. |
| | (Continued) | |

FOREIGN PATENT DOCUMENTS

| | | |
|---|---|---|
| TW | 202021297 A | 6/2020 |
| WO | 2020166082 A1 | 8/2020 |

OTHER PUBLICATIONS

3GPP, "3rd Generation Partnership Project; Technical Specification Group Radio Access Network; NR; Physical layer procedures for control (Release 16)", 3GPP TS 38.213, V16.3.0, 2020, 179 pages.

(Continued)

*Primary Examiner* — Bo Hui A Zhu
(74) *Attorney, Agent, or Firm* — Renaissance IP Law Group LLP

(57) ABSTRACT

A method of semi-persistently scheduled (SPS) release, comprising: receiving, by a user equipment (UE), one or more occasions of SPS physical downlink shared channels (PDSCHs) over multiple slots for a transport block (TB) according to an SPS configuration; receiving, by the UE, a physical downlink control channel (PDCCH) including a downlink control information (DCI) format such that an end of a last symbol of the PDCCH is received before or at a same time as an end of a last symbol of a first occasion of a received SPS PDSCH; and releasing, by the UE, the SPS configuration in response to receiving the PDCCH.

20 Claims, 18 Drawing Sheets

(56) References Cited

U.S. PATENT DOCUMENTS

| | | |
|---|---|---|
| 2016/0218798 A1 | 7/2016 | Yang et al. |
| 2018/0014284 A1 | 1/2018 | Yi et al. |
| 2019/0090266 A1 | 3/2019 | Zhao |
| 2019/0174327 A1* | 6/2019 | You ......................... H04W 4/70 |
| 2021/0218504 A1 | 7/2021 | Wang et al. |
| 2022/0116972 A1* | 4/2022 | Liu ........................... H04L 1/08 |
| 2022/0141860 A1* | 5/2022 | Elshafie ................ H04W 72/23 |
| | | 455/452.1 |
| 2023/0006798 A1* | 1/2023 | Lee ....................... H04L 1/1607 |

OTHER PUBLICATIONS

CATT, "Remaining Issues on SPS Enhancement", 3GPP TSG RAN WG1 Meeting #102-e, e-meeting, 7.2.5.7, R1-2005678, 2020, 8 pages.

European Extended Search Report for Application No. 21208947.8, mailed Apr. 19, 2022.

Qualcomm, "Remaining Issues on Uplink Collision Handling and SPS for URLLC", 3GPP TSG RAN WG1 #102e, 7.2.5.7, R1-2006779, 2020, 3 pages.

* cited by examiner

```
-- ASN1START
-- TAG-SPS-CONFIG-START

SPS-CONFIG ::=           SEQUENCE {
    periodicity              ENUMERATED {ms10, ms20, ms32, ms40, ms64, ms80,
ms128, ms160, ms320, ms640,          spare6, spare5, spare4, spare3, spare2,
spare1},
    nrofHARQ-Processes       INTERGER (1..8),
    n1PUCCH-AN               PUCCH-ResourceId
OPTIONAL,   -- Need M
    mcs-Table                ENUMERATED {qam64LowSE}
OPTIONAL,   -- Need S
    ...
}
```

FIG. 1

METHODS, SYSTEMS, AND DEVICES FOR SPS PDSCH RELEASE

CROSS-REFERENCE TO RELATED APPLICATIONS

This application claims the benefit of U.S. Provisional Patent Application Nos. 63/117,886 filed Nov. 24, 2020, 63/133,679 filed Jan. 4, 2021, 63/142,589 filed Jan. 28, 2021, and 63/225,882 filed Jul. 26, 2021 in the United States Patent and Trademark Office, the entire contents of which are herein incorporated by reference.

FIELD

The present disclosure is generally related to wireless communication systems. In particular, the present disclosure is related to methods for handling collision and release of multiple SPS PDSCH configurations.

BACKGROUND

In release 15 (Rel-15) $3^{rd}$ Generation Partnership Project (3GPP) new radio (NR) technology, the downlink traffic may be either dynamic grant (DG) physical downlink shared channel (PDSCH) or semi-persistently scheduled (SPS) PDSCH. However, there is a need for better optimization with regard to SPS PDSCH release and collision among SPS PDSCHs.

SUMMARY

According to one embodiment, a method of semi-persistently scheduled (SPS) release, comprising: receiving, by a user equipment (UE), one or more occasions of SPS physical downlink shared channels (PDSCHs) over multiple slots for a transport block (TB) according to an SPS configuration; receiving, by the UE, a physical downlink control channel (PDCCH) including a downlink control information (DCI) format such that an end of a last symbol of the PDCCH is received before or at a same time as an end of a last symbol of a first occasion of a received SPS PDSCH; and releasing, by the UE, the SPS configuration in response to receiving the PDCCH.

According to one embodiment, a system for semi-persistently scheduled (SPS) release, the system comprising a processor; and a memory storing non-transitory processor-executable instructions that, when executed by the processor, cause the processor to: receive one or more occasions of SPS physical downlink shared channels (PDSCHs) over multiple slots for a transport block (TB) according to an SPS configuration, receive a physical downlink control channel (PDCCH) including a downlink control information (DCI) format such that an end of a last symbol of the PDCCH is received before or at a same time as an end of a last symbol of a first occasion of a received SPS PDSCH, and release the SPS configuration in response to receiving the PDCCH.

According to one embodiment, a user equipment (UE) configured for semi-persistently scheduled (SPS) release, the UE comprising a receiver. The receiver is configured to receive one or more occasions of SPS physical downlink shared channels (PDSCHs) over multiple slots for a transport block (TB) according to an SPS configuration, receive a physical downlink control channel (PDCCH) including a downlink control information (DCI) format such that an end of a last symbol of the PDCCH is received before or at a same time as an end of a last symbol of a first occasion of a received SPS PDSCH, and release the SPS configuration in response to receiving the PDCCH.

According to one embodiment, the PDCCH indicates a release of the SPS PDSCHs.

According to one embodiment, the PDSCH is configured with an aggregation factor AF≥1 on a PDSCH cell.

According to one embodiment, the PDSCH is configured with an aggregation factor AF=1 on a PDSCH cell.

According to one embodiment, the UE stops PDSCH decoding and does not generate HARQ-ACK feedback information for the received occasions of SPS PDSCHs.

According to one embodiment, an acknowledgment or no-acknowledgment (A/N) of the PDCCH and an A/N of the SPS PDSCH are mapped to a same physical uplink control channel (PUCCH).

According to one embodiment, the UE receives the PDCCH before an end of the SPS PDSCH occasions among repetitions.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 1 illustrates an SPS configuration information element, according to some embodiments;

DETAILED DESCRIPTION

Figure 2:
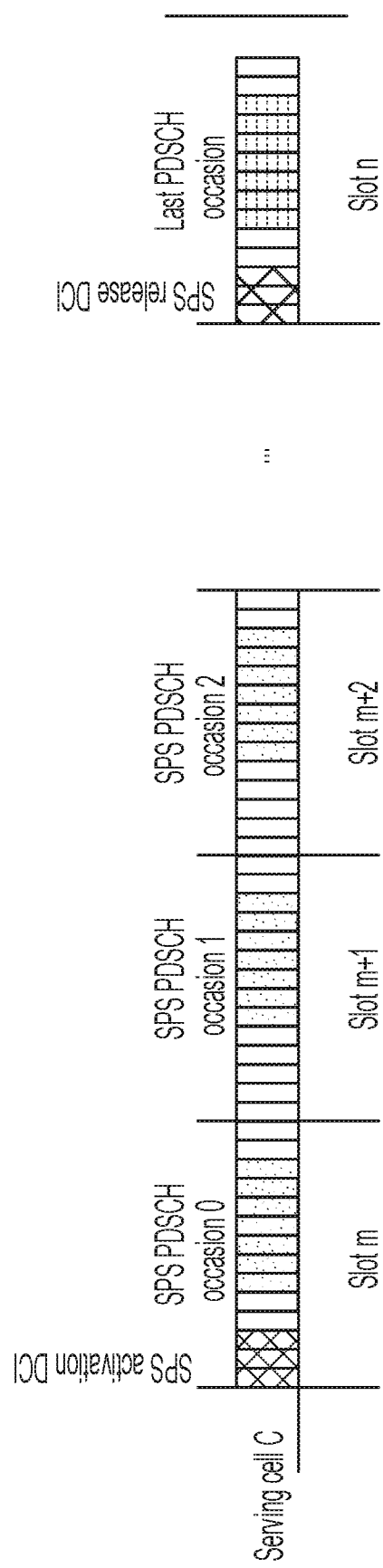
FIG. 2 illustrates an SPS operation, according to some embodiments.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

In release 15 (Rel-15) 3GPP new radio (NR) technology, the downlink traffic can be either dynamic grant (DG) physical downlink shared channel (PDSCH) or semi-persistently scheduled (SPS) PDSCH. A DG-PDSCH may be scheduled by a scheduling physical downlink control channel (PDCCH), wherein the PDCCH conveys the downlink control information (DCI) to the user equipment (UE). DCI includes, among other information, the time and frequency resources in which the UE can receive the PDSCH. DG-PDSCHs can be received by receiving the scheduling DCI.

On the other hand, SPS PDSCH may be employed to enable the UE to receive the PDSCH without a scheduling DCI. With the SPS PDSCH, the Next Generation Node B base station (gNB) configures the UE with one or more SPS configurations via radio resource control (RRC) messages. AN SPS configuration information element (IE) per serving cell per bandwidth part (BWP) may include periodicity, physical uplink control channel (PUCCH) resource information and other information required for SPS operation as shown below in FIG. 1. Note that in the information element (IE) of FIG. 1, the minimum periodicity is 10 ms (10 slots for subcarrier spacing of 15 KHz). The periodicity in this figure is chosen for the sake of illustrating an example, and embodiments according to the present disclosure are not limited thereto.

An SPS configuration may be activated by an activation DCI, which in general can be any of the DCI formats that schedule a DG-PDSCH with some additional validation mechanism performed. Compared to a DCI scheduling a DG-PDSCH, an SPS activation DCI may be scrambled by a configured scheduling radio network temporary identifier (CS-RNTI) and some specific DCI fields may be specially used for identification of SPS activation, including new data indicator (NDI), hybrid automatic repeat request (HARQ) process number (HPN) and redundancy version (RV). The SPS activation DCI schedules the first SPS PDSCH occasion like a DG-PDSCH. SPS occasions may be determined according to the periodicity IE in the SPS configuration and the time and frequency domain resource indicated by the activation DCI. An example of such SPS PDSCH operation is shown in FIG. 2, where a periodicity of one slot is assumed.

In FIG. 2, the SPS activation DCI is received, in slot m and indicates/schedules the first SPS PDSCH occasion 0 in slot m. The next SPS PDSCH occasions are determined according to the periodicity of 1 slot. Within the SPS slots, the time-frequency resources may follow that of the first SPS occasion. Finally, the active SPS configuration may be released by the release DCI in slot n. Although the release DCI technically may not schedule a resource, it is assumed that the release DCI is associated with one last PDSCH occasion. This last PDSCH occasion is shown in slot n in FIG. 2. This is only used for semi-static HARQ-ACK codebook construction. UE assumes that there will be no SPS PDSCH reception in this last occasion. The periodicity in this figure is chosen for the sake of illustrating an example, and embodiments according to the present disclosure are not limited thereto.

Figure 3:
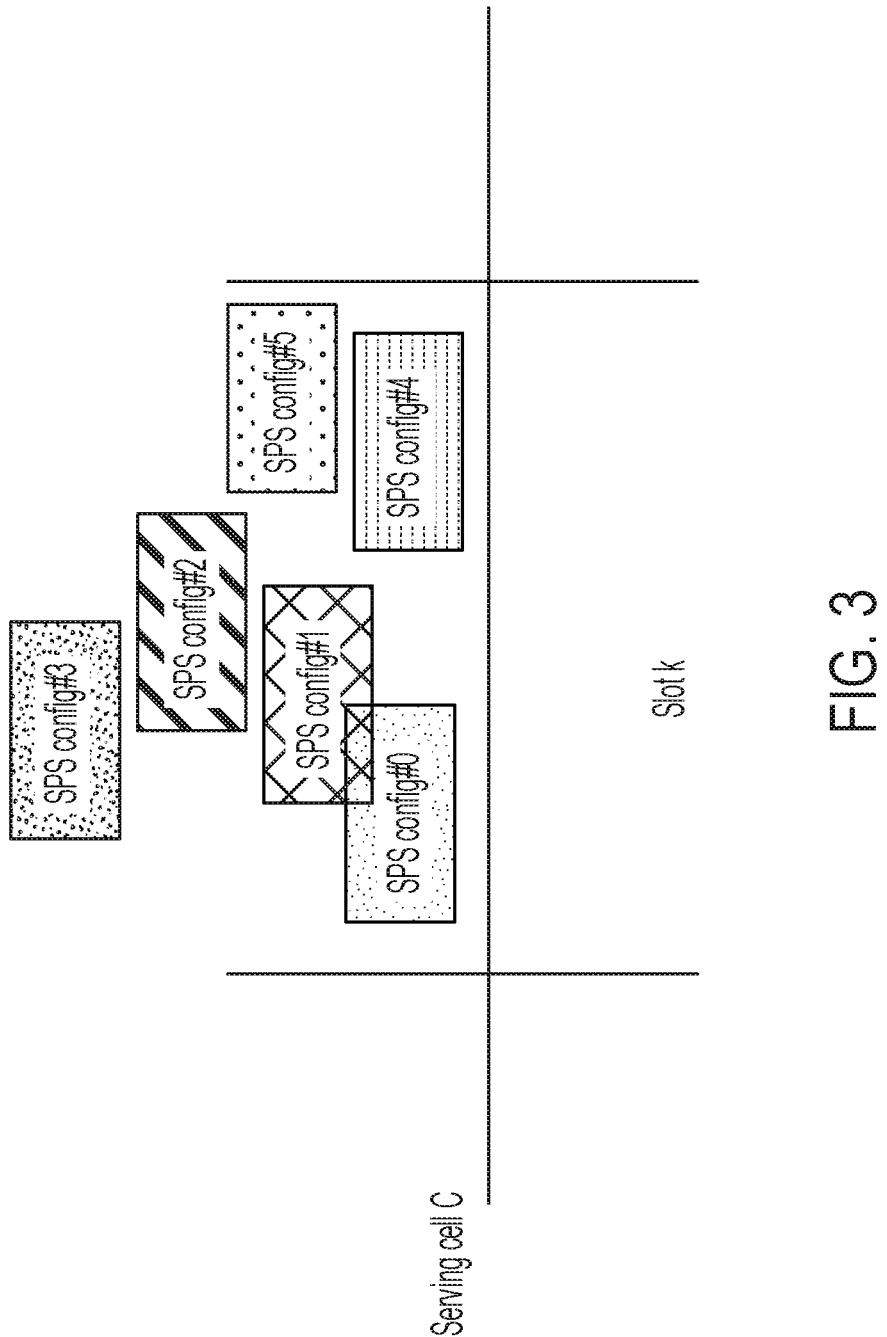
FIG. 3 illustrates a set of overlapping SPS occasions and the corresponding type-1 HARQ-ACK codebook subgroups, according to some embodiments.

In Rel-15, there may be multiple active SPS PDSCH configurations per bandwidth part (BWP). There may also be up to one active SPS configuration per BWP of a serving cell. To provide more flexibility to gNB to schedule ultra-reliable low latency communications (uRLLC) and satisfy the latency requirements, multiple active SPS configurations per serving cell per BWP may be allowed. With allowing multiple active SPS configurations per BWP of serving cell, it could be the case that multiple active SPS occasions overlap in time/frequency in one slot as shown in FIG. 3. In this case, some issues which were not present in Rel-15 may be addressed according to some embodiments.

In Rel-15/16, the acknowledgment or no-acknowledgment (A/N) of an activated SPS configuration is transmitted in a PUCCH in a slot determined based on a slot offset K_1 from the slot of the PDSCH, where K_1 is indicated in the activation DCI and is applied to all SPS PDSCH receptions for the same configuration index.

Unlike the activation PDCCH, the A/N timing of the release PDCCH is measured from the slot in which the PDCCH is received. The release DCI includes an indication of the K_1 value. One single A/N is reported in case of single or joint release. While for type-2 HARQ-ACK codebook, the A/N of the release PDCCH is within the dynamic portion of the codebook, with the type-1 HARQ-ACK codebook, the location of the A/N for the PDCCH release is the same as the location of the SPS PDSCH reception with lowest configuration index in the slot. This is referred to as collision between the location of SPS A/N and the release PDCCH for type-1 HARQ ACK codebook.

In Rel-15, when the UE declares a capability to receive a maximum of one PDSCH per slot, or one A/N bit per PDSCH slot, if the release PDCCH and the SPS PDSCH are received in the same slot, the collision scenario may take place. Therefore, according to some embodiments, the UE may not expect to receive the PDCCH and the PDSCH in the same slot if their A/N bits are mapped to same PUCCH. In Rel-16 due to smaller SPS PDSCH periodicities down to one slot, reception of the PDCCH and the PDSCH in different slots or reception in the same slot with different PUCCHs seemed a significant restriction on the scheduler. Therefore, some embodiments may support the reception of them in the same slot and same PUCCH. In this case, the UE generates one A/N bit for the release PDCCH and does not receive the PDSCH if the PDCCH ends before the end of the PDSCH. Although this behavior is justifiable for type-1 HARQ ACK codebook, according to some embodiments, it may be applied regardless of the HARQ-ACK codebook type configuration. Furthermore, according to some embodiments, no restriction is applied for the case of the A/N bits mapped to different PUCCHs.

In addition to the A/N aspects of SPS PDSCH mentioned above, due to multiple SPS configurations and shorter periodicities down to one slot in Rel-16, some embodiments may define a clear timeline according to which UE determines whether or not to receive the SPS PDSCH. Such a timeline may be used by gNB to commit the transmission of the SPS PDSCH as well. According to some embodiments, if gNB transmits the release PDCCH in the same slot as the SPS PDSCH, and the PDCCH ends before the end of the PDSCH, the UE may not be expected to receive the SPS PDSCH as the SPS PDSCH is being released. This argument applies regardless of whether or not the A/N of the PUCCH and PDSCH would be mapped to the same PUCCH.

Some embodiments of Phy layer priority in Rel-16 uRLLC may indicate a two level priority for channels. For example:

Priority of DG PDSCH or DG PUSCH is indicated by a priority indicator field in the scheduling DCI, if the field is configured to be present in the DCI, otherwise the PDSCH or PUSCH is of low priority, i.e. priority index 0.

Priority of SPS PDSCH or SPS PDSCH release is indicated by RRC configuration of the SPS configuration. In particular, priority is indicated by harq-CodebookID.

Priority of a configured grant (CG) PUSCH is determined based on a priority index given in the RRC configuration of the CG PUSCH.

For a PUCCH transmission including A/N, the priority of PUCCH is determined according to the priority of the PDSCHs.

For a PUCCH transmission with scheduling request (SR), the priority is given by a priority indicator in SchedulingRequestResourceConfig.

For a PUSCH transmission with semi-persistent channel state information (SP-CSI) or aperiodic CSI (A-CSI), the priority is indicated in the activating/triggering DCI.

A PUCCH transmission with CSI is of low priority index

The priority indication allows for intra-UE prioritization where in case of collision between a low priority (LP) and high priority (HP) channel, the LP channel is dropped by the UE. An intra-UE collision may refer to a collision between two channels transmitted or received by the same UE. The two channels have different prioritizations, e.g., one low priority one high priority.

The UE can be provided with two PUCCH-Configs where each PUCCH-Config is associated with a sub-slot length given by subslotLengthForPUCCH and a certain number of PUCCH resource sets and PUCCH resources. The configured PUCCH resources are within a number of symbols in the slot according to the subslotLengthForPUCCH. The first PUCCH-Config corresponds to low priority index, i.e. priority index #0 and the second PUCCH-Config corresponds to high priority index, i.e. priority index #1. PUCCH resources of any SR configurations with priority index #0 is within the sub-slot of the first PUCCH-Config and the resources of any SR configuration with priority #1 is within the sub-slot of the second PUCCH-Config. The PUCCH resources of any CSI report configurations in any PUCCH-Config is within the sub-slot of the first PUCCH-Config.

The UE can be configured with two different HARQ_ACK codebooks (CBs), one with priority index #0 and the other with priority index #1 whose corresponding PUCCHs are transmitted within the sub-slot configuration of the two PUCCH-Configs. UE is not expected to transmit more than one PUCCH per sub-slot per HARQ-ACK CB (priority).

The UE multiplexes all the A/N of low priority into the first HARQ_ACK CB and all the A/N of the high priority in the second HARQ-ACK CB.

Collision handling is another aspect of the present technology. In case of multiple active SPS PDSCH configuration on a BWP of a serving cell, the UE may only receive certain SPS PDSCHs that are not overlapping and determined according to the SPS configuration indices. The following describes handling of the collision between SPS PDSCHs in a slot:

TABLE 1

If more than one PDSCH on a serving cell each without a corresponding PDCCH transmission are in a slot, after resolving overlapping with symbols in the slot indicated as uplink by tdd-UL-DL-Configuration-Common, or by tdd-UL-DL-ConfigurationDedicated, a UE receives one or more PDSCHs without corresponding PDCCH transmissions in the slot as specified below.
  Step 0: set j = 0, where j is the number of selected PDSCH(s) for decoding. Q is the set of activated PDSCHs without corresponding PDCCH transmissions within the slot
  Step 1: A UE receives one PDSCH with the lowest configured sps-ConfigIndex within Q, set j = j + 1. Designate the received PDSCH as survivor PDSCH.
  Step 2: The survivor PDSCH in step 1 and any other PDSCH(s) overlapping (even partially) with the survivor PDSCH in step 1 are excluded from Q.
  Step 3: Repeat step 1 and 2 until Q is empty or j is equal to the number of unicast PDSCHs in a slot supported by the UE Table 2 may be utilized to determine the UE behavior when the UE is not expected to receive SPS PDSCHs, after the UE has received a corresponding release PDCCH:

TABLE 2

If a UE is configured to receive an SPS PDSCH in a slot for an SPS configuration, and if the UE receives a PDCCH indicating an SPS PDSCH release corresponding to the SPS configuration in the slot where the end of
a last symbol of the PDCCH reception is not after the end of a last symbol
of the SPS PDSCH reception, and if HARQ-ACK information for the SPS PDSCH release and the SPS PDSCH reception would be multiplexed in a same PUCCH, the UE does not expect to receive the SPS PDSCH, does not generate HARQ-ACK information for the SPS PDSCH reception, and generates a HARQ-ACK information bit for the SPS PDSCH release.

Figure 4:
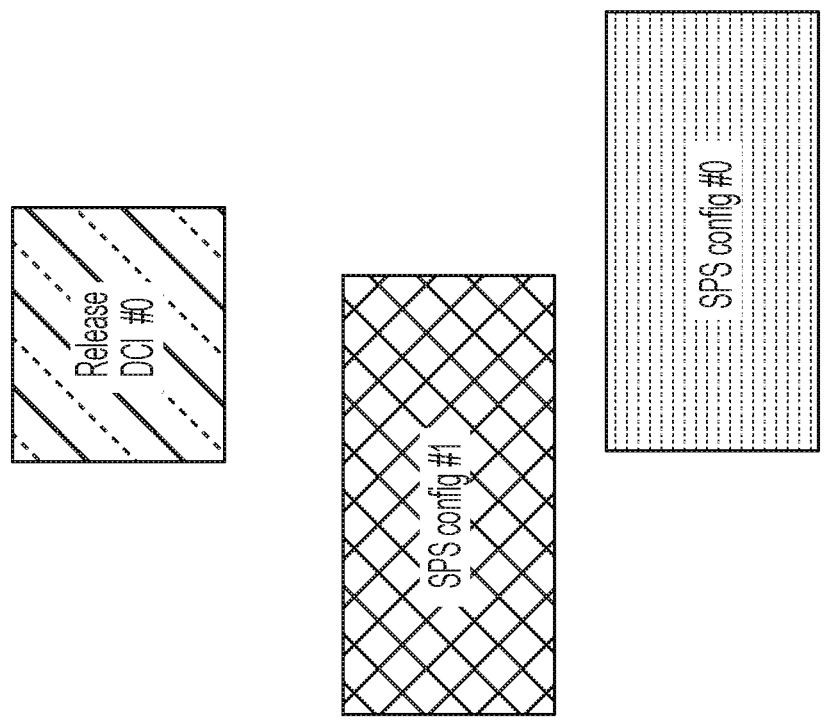
FIG. 4 illustrates an example of the different outcomes of UE behavior for reception of SPS PDSCHs, according to some embodiments.

Although the factors in Table 2 may determine UE behavior for reception of SPS PDSCHs, the order of applying the factors may result in different outcomes. FIG. 4 depicts an example of the different outcomes. The release PDCCH only releases configuration #0 and it is also assumed that the A/N of all SPS PDSCHs and that of release PDCCH are mapped to the same PUCCH.

Behavior 1: If the UE resolves the collision among the SPS PDSCHs first, SPS PDSCH config #1 is NOT received as it has a larger configuration index than SPS config #0. Removing SPS config #1 from the figure and then, SPS PDSCH #0 is NOT received as its ending symbol is later than that of the release DPCCH. Moreover, A/N generation for Type-1 and Type-2 CB will be as follows.
  1. Type-1 CB: (negative acknowledgement #1 (NACK #1), acknowledgment #0 (ACK #0)) is transmitted assuming two containers are available, i.e. the Telecommunications and Digital Government Regulatory Authority (TDRA) associations of SPS #1 and SPS #0 fall into two different subgroup for Type-1 CB according to technical specifications (TS) 38.213 (the 5G NR control channel specification).
  2. Type-2 CB: ACK #0 is transmitted.

Behavior 2: If SPS PDSCH #0 is NOT received as its ending symbol is later than that of the release dedicated physical control channel (DPCCH). Removing SPS PDSCH #0, UE resolves the collision among the SPS PDSCHs first, SPS PDSCH config #1 is received as it does not overlap with an SPS PDSCH with a lower configuration index. Moreover, A/N generation for Type-1 and Type-2 CB will be as follows.
  1. Type-1 CB: (ACK #1,ACK #0) is transmitted assuming two containers are available, i.e. TDRA associations of SPS #1 and SPS #0 fall into two different subgroup for Type-1 CB according to TS 38.213.
  2. Type-2 CB: (ACK #0,ACK #1) is transmitted by appending A/N of SPS PDSCH #1 to the end of the dynamic portion of type-2 CB, which here is assumed to only include the release DCI for config #0.

As can be seen, the UE behavior can be different when the above are applied in different orders. As mentioned before, the UE may determine which SPS PDSCHs in a slot it is expected to receive. To remove ambiguity to this end, an order may be defined as follows:

Method 0-1: (First SPS collision handling→Second SPS Release handling) In case of collision among multiple SPS PDSCHs within a slot on a BWP of a serving cell, Step 1) UE first applies a collision handling resolution to determine the set of SPS PDSCHs UE is expected to receive. The collision handling resolution is based on SPS PDSCH configuration index. An example of such resolution method is the pseudo-code in Rel-16 which is shown in Table 1. Once the set of survived SPS PDSCHs are determined, Step 2) UE applies any method to determine which SPS PDSCHs are considered as released and therefore are not expected to be received by UE. An example of the second step is shown in Table 2; if the end of a last symbol of the PDCCH reception is not after the end of a last symbol of the SPS PDSCH reception for the same SPS configuration and the ACK/NACK of release PDCCH and the SPS PDSCH are mapped to the same PUCCH, UE is not expected to receive the SPS PDSCH.

Since the UE knows all the semi-static configurations via RRC, it may resolve the SPS collision handling in all the slots prior to receiving any DCI that affects the SPS PDSCH reception. Therefore, it looks natural for UE to apply the SPS collision handling first to determine the set of survived SPS PDSCHs and then, upon reception of a release PDCCH in a slot, determine which SPS PDSCHs among the survived ones are not expected to be received. Although this method has the least implementation effect and least system performance, the reverse order may be adopted as a different method according to some embodiments as well:

Method 0-2: (First SPS Release handling→Second SPS collision handling) In case of collision among multiple SPS PDSCHs within a slot on a BWP of a serving cell, Step 1) UE first applies a method to determine which SPS PDSCHs are considered as released and therefore are not expected to be received by UE. An example of the first step is shown in Table 2; if the end of a last symbol of the PDCCH reception is not after the end of a last symbol of the SPS PDSCH reception for the same SPS configuration and the ACK/NACK of release PDCCH and the SPS PDSCH are mapped to the same PUCCH, UE is not expected to receive the SPS PDSCH. Once the set of received SPS PDSCHs are determined from Step 1, at Step 2) UE applies a collision handling resolution to determine the set of SPS PDSCHs UE is expected to receive among the remaining SPS PDSCHs from Step 1. The collision handling resolution is based on SPS PDSCH configuration index. An example of such resolution method is the pseudo-code in Rel-16, which is shown in Table 1.

One issue with Method 0-2 is when type-2 HARQ-ACK codebook is used and the A/N of the release PDCCH takes the same location as that of an unreleased SPS PDSCH. In this case, the unreleased SPS PDSCH is expected to be received, but its A/N cannot be reported as there will not be an available location for it. Turning again to FIG. 4, with behavior 2 and type-1 codebook, SPS PDSCH with #0 is released and UE is not expected to receive it. One A/N bit is generated for release PDCCH in the location of SPS PDSCH #0. SPS PDSCH #1 is expected to be received but since SPS #0 and SPS #1 are in the same type-1 codebook subgroup, there will be only one A/N bit for both PDSCHs. The following discloses example methods to handle this scenario according to some embodiments:

Method 0-2-1: (First SPS Release handling→Second SPS collision handling) One of the 3 alternatives below may be used for A/N determination of method 0-2.

Alt 1: The following is an error case: a) Type-1 HARQ codebook is configured and b) the A/N location of the release PDCCH and that of an unreleased SPS PDSCH whose A/N is mapped to the same PUCCH as the release PDCCH, are the same.

Alt 2: If a) Type-1 CB is configured and b) the A/N location of the release PDCCH and that of an unreleased SPS PDSCH whose A/N is mapped to the same PUCCH as the release PDCCH, are the same, then one bit A/N is generated as the logical AND of the A/N of the release PDCCH and that of the unreleased PDSCH.

Alt 3: If a) Type-1 CB is configured and b) the A/N location of the release PDCCH and that of an unreleased SPS PDSCH whose A/N is mapped to the same PUCCH as the release PDCCH, are the same, SPS collision handling pseudo-code (table 1) is invoked to resolve the collision among the SPS PDSCHs and the released one assuming the release one is not released.

As an example, in FIG. 4, if SPS #0 and SPS #1 are in the same type-1 CB subgroup and are mapped to the same PUCCH the following may occur:

With Alt 1, this is an error case

With Alt 2, one A/N bit is generated as the AND of A/N of SPS release PDCCH and that of SPS PDSCH #1

With Alt 3, Pseudo-code in Table 1 is invoked to resolve the collision among the SPS #1 and released SPS #0 assuming #0 is not released. SPS #1 is then removed and is not expected to be received by UE. One A/N is generated for SPS release PDCCH.

Figure 5:
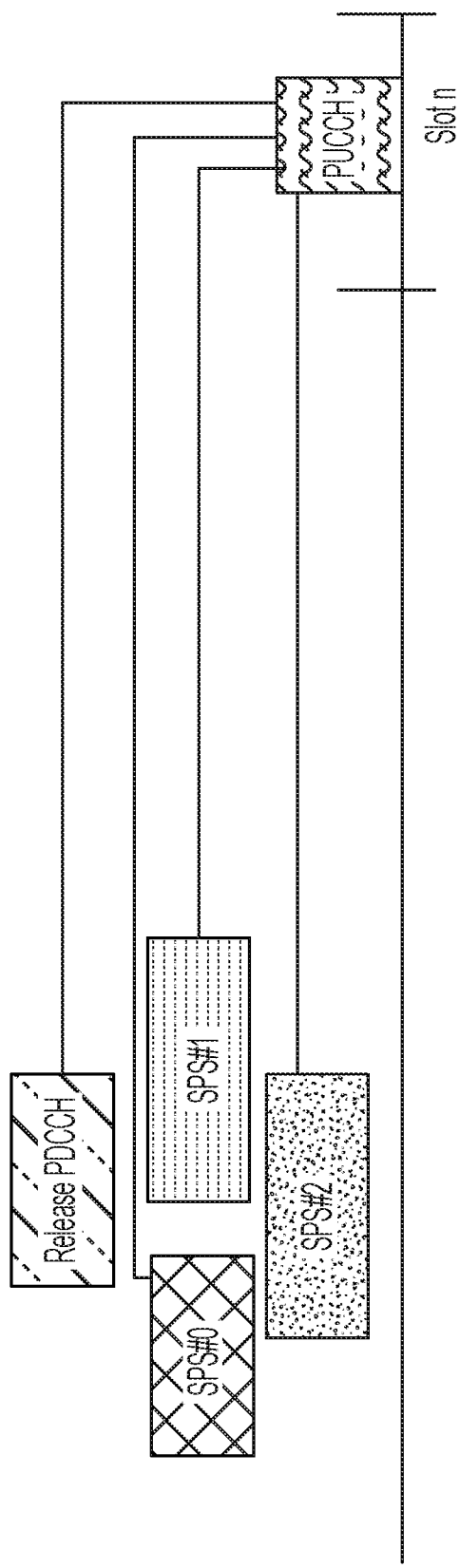
FIG. 5 illustrates a joint SPS release, according to some embodiments.

Issues may arise with the Joint SPS Release timeline. We name this issue "problem #1." It is possible in Rel-16 that a release PDCCH might jointly indicate the release of multiple SPS PDSCH configuration indices. In case of joint SPS release, there may be different interpretations. FIG. 5 depicts one such example of this.

In FIG. 5, the SPS #0 ends before the end of the release PDCCH, while SPS #1 ends after the end of the release PDCCH. This situation may also take place in cross carrier scheduling with different numerologies when the subcarrier spacing (SCS) of the release DCI is smaller than that of SPS PDSCH slot. In this case, the release PDCCH may overlap with multiple SPS PDSCH slots.

The following describes further details of multiple methods to determine UE behavior for joint SPS release. The provided solutions are mainly based on a reference slot to determine the UE behavior. The reference slot may be the PDCCH slot, PDSCH slot or the slot with smallest SCS among the two. The PDCCH slots is defined as the slot on the scheduling cell in which the release PDCCH is transmitted. The PDSCH slots is defined as the slot on the scheduled cell in which the ending symbol the release PDCCH ends. The slot based on the smallest SCS configuration may be PDCCH or PDSCH slot, whichever has the smallest SCS.

As one solution network may only need to ensure that the SPS release PDCCH ends before at least one of the indicated SPS PDSCH. We consider the following methods:

Method 1-A: (Release PDCCH ends before the end of at least one SPS PDSCHs $\mu_{PDCCH} \leq \mu_{PDSCH}$) According to some embodiments, an SPS release PDCCH in a PDCCH slot may indicate the release of SPS PDSCH configurations indices $i_1, i_2, \ldots, i_N$, on the PDSCH cell such that 1) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in the $$2^{\mu_{PDSCH} - \mu_{PDCCH}}$$

PDSCH slots within the PDCCH slot and 2) ACK/NACK of the release PDCCH and L≤M SPS PDSCHs among the M PDSCHs are mapped to the same PUCCH and 3) the release PDCCH is received after the end of at least one of the SPS PDSCHs among the L SPS PDSCH receptions.

Method 1-B: (Release PDCCH ends before the end of at least one SPS PDSCHs $\mu_{PDCCH} \geq \mu_{PDSCH}$) According to some embodiments, an SPS release PDCCH in a PDCCH slot may indicate the release of SPS PDSCH configurations indices $i_1, i_2, \ldots, i_N$, on the PDSCH cell such that 1) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in the SPS PDSCH slot that contains the PDCCH slot and 2) ACK/NACK of the release PDCCH and L≤M SPS PDSCHs among the M PDSCHs are mapped to the same PUCCH and 3) the release PDCCH is received after the end of at least one of the SPS PDSCHs among the L SPS PDSCH receptions.

According to some embodiments, the network may send the SPS release PDCCH ahead of all the SPS PDSCHs in the largest slot among the PDCCH slot and the PDSCH slot. This may cause an increased network restriction, but may involve the least amount of challenge regarding UE implementation for processing of SPS PDSCHs and the A/N reporting.

Method 1-1: (Release PDCCH ends before the end of all SPS PDSCHs $\mu_{PDCCH} \leq \mu_{PDSCH}$; smallest SCS slot) According to some embodiments, an SPS release PDCCH in a PDCCH slot indicates the release of SPS PDSCH configurations indices $i_1, i_2, \ldots, i_N$, on the PDSCH cell such that 1) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in the $$2^{\mu_{PDSCH} - \mu_{PDCCH}}$$

PDSCH slots within the PDCCH slot and 2) ACK/NACK of the release PDCCH and L≤M SPS PDSCHs among the M PDSCHs are mapped to the same PUCCH and 3) the release PDCCH is received after the end of any of the L SPS PDSCH receptions.

Method 1-2: (Release PDCCH ends before the end of all SPS PDSCHs; smallest SCS slot $\mu_{PDCCH} \geq \mu_{PDSCH}$) According to some embodiments, an SPS release PDCCH in a PDCCH slot indicates the release of SPS PDSCH configurations indices $i_1, i_2, \ldots, i_N$ on the PDSCH cell, such that 1) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in the PDSCH slot containing the PDCCH slot and 2) ACK/NACK of the release PDCCH and L≤M SPS PDSCHs among the M PDSCHs are mapped to the same PUCCH and 3) the release PDCCH is received after the end of any of the L SPS PDSCH receptions.

Method 1-3: (Release PDCCH ends before the end of all SPS PDSCHs; PDSCH slot) According to some embodiments, an SPS release PDCCH in a PDCCH slot indicates the release of SPS PDSCH configurations indices $i_1, i_2, \ldots, i_N$ on the PDSCH cell, such that 1) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in the last PDSCH slot containing or overlapping with the ending symbol of the PDCCH and 2) ACK/NACK of the release PDCCH and L≤M SPS PDSCHs among the M PDSCHs are mapped to the same PUCCH and 3) the PDCCH is received after the end of any of the L SPS PDSCH receptions. In case of a scenario where 1) and 2) hold but 3) does not, i.e. PDCCH is received before the end of all the L SPS PDSCHs, all the L SPS PDSCHs in the PDSCH slots are considered as released and all the indicated SPS PDSCHs in the previous PDSCH slots overlapping with the PDCCH slots are received.

Method 1-4: (Release PDCCH ends before the end of all SPS PDSCHs; PDSCH slot) According to some embodiments, an SPS release PDCCH in a PDCCH slot indicates the release of SPS PDSCH configurations indices $i_1, i_2, \ldots, i_N$ on the PDSCH cell, such that 1) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in any of the PDSCH slots that overlap with the PDCCH slot and 2) ACK/NACK of the release PDCCH and L≤M SPS PDSCHs among the M PDSCHs are mapped to the same PUCCH and 3) the PDCCH is received after the end of any of the L SPS PDSCH receptions Methods 1-1 to 1-4 may have some limitations in the sense that network would likely have to transmit the release PDCCH early enough in the corresponding slot. Different less limiting alternatives are proposed below.

Method 1-5: (Only SPS PDSCHs that end after the end of the release PDCCH are released $\mu_{PDCCH} \leq \mu_{PDSCH}$; smallest SCS slot). TS 38.213 supports the reception of an SPS release PDCCH in a PDCCH slot indicating the release of SPS PDSCH configurations indices $i_1, i_2, \ldots, i_N$ (N≥1) on the SPS PDSCH cell such that 1) SCS numerology of the release PDCCH is smaller than or equal to that of the SPS PDSCH cell and 2) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in the $$2^{\mu_{PDSCH} - \mu_{PDCCH}}$$

SPS PDSCH slots within the PDCCH slot and 3) ACK/NACK of the release PDCCH and L≤M SPS PDSCHs are mapped to the same PUCCH.

In this case, the SPS release PDCCH is only applicable to R≤L SPS PDSCHs for which the end of the ending symbol of the PDSCH is not before the end of the ending symbol of release PDCCH. These SPS PDSCHs are considered as released and UE is not expected to receive them within the PDCCH slot.

1 bit A/N is generated for the SPS release PDCCH and the R released SPS PDSCHs.

Figure 6:
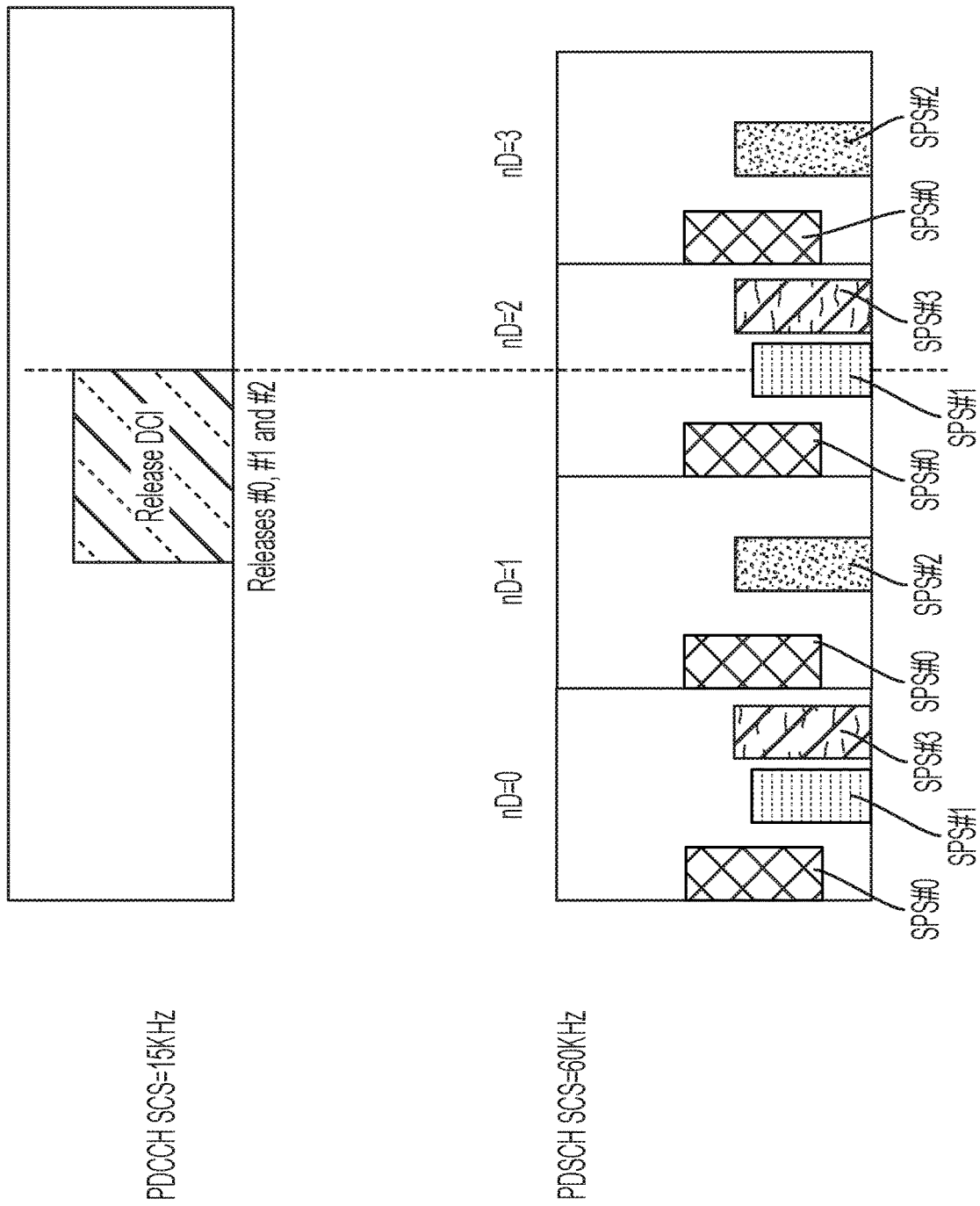
FIG. 6 illustrates a release PDCCH, according to some embodiments.

An example is shown in FIG. 6, where the release PDCCH indicates the release of N=3 SPS PDSCH with configuration indices {0, 1, 2}. It is assumed that the A/N of the indicated SPS PDSCHs are mapped to the same PUCCH as the release PDCCH. The SPS PDSCHs are considered to be released according to Method 1-3. None of the SPS PDSCHs in slots nD=0 and nD=1 are considered to be released. One A/N bit for each of these SPS PDSCHs is generated. In slot nD=2, only SPS PDSCH with configuration index #1 is considered to be released, and finally in slot nD=3, SPS PDSCHs with configuration indices 0 and 2 are considered to be released. The UE is not expected to receive SPS PDSCHs that are considered to be released. 1 bit A/N is generated for the set of released SPS PDSCHs and the release PDCCH.

Method 1-6: (Only SPS PDSCHs that end after the end of the release PDCCH are released $\mu_{PDCCH} \geq \mu_{PDSCH}$; smallest SCS slot) A UE may receive an SPS release PDCCH in a PDCCH slot indicating the release of SPS PDSCH configurations indices $i_1, i_2, \ldots, i_N$ (N≥1) on the SPS PDSCH cell such that 1) SCS numerology of the release PDCCH is greater than or equal to that of the SPS PDSCH cell and 2) M≤N SPS PDSCH configuration indices $j_1, j_2, \ldots, j_M$ where $\{j_1, j_2, \ldots, j_M\} \subseteq \{i_1, i_2, \ldots, i_N\}$ are configured to be received in the SPS PDSCH slots that contain the PDCCH slot and 3) ACK/NACK of the release PDCCH and L≤M SPS PDSCHs are mapped to the same PUCCH.

In this case, the SPS release PDCCH is only applicable to R≤L SPS PDSCHs for which the end of the ending symbol of the PDSCH is not before the end of the ending symbol of release PDCCH. These SPS PDSCHs are considered as released and UE is not expected to receive them within the PDSCH slot.

1 bit A/N is generated for the SPS release PDCCH and the R released SPS PDSCHs.

Figure 7:
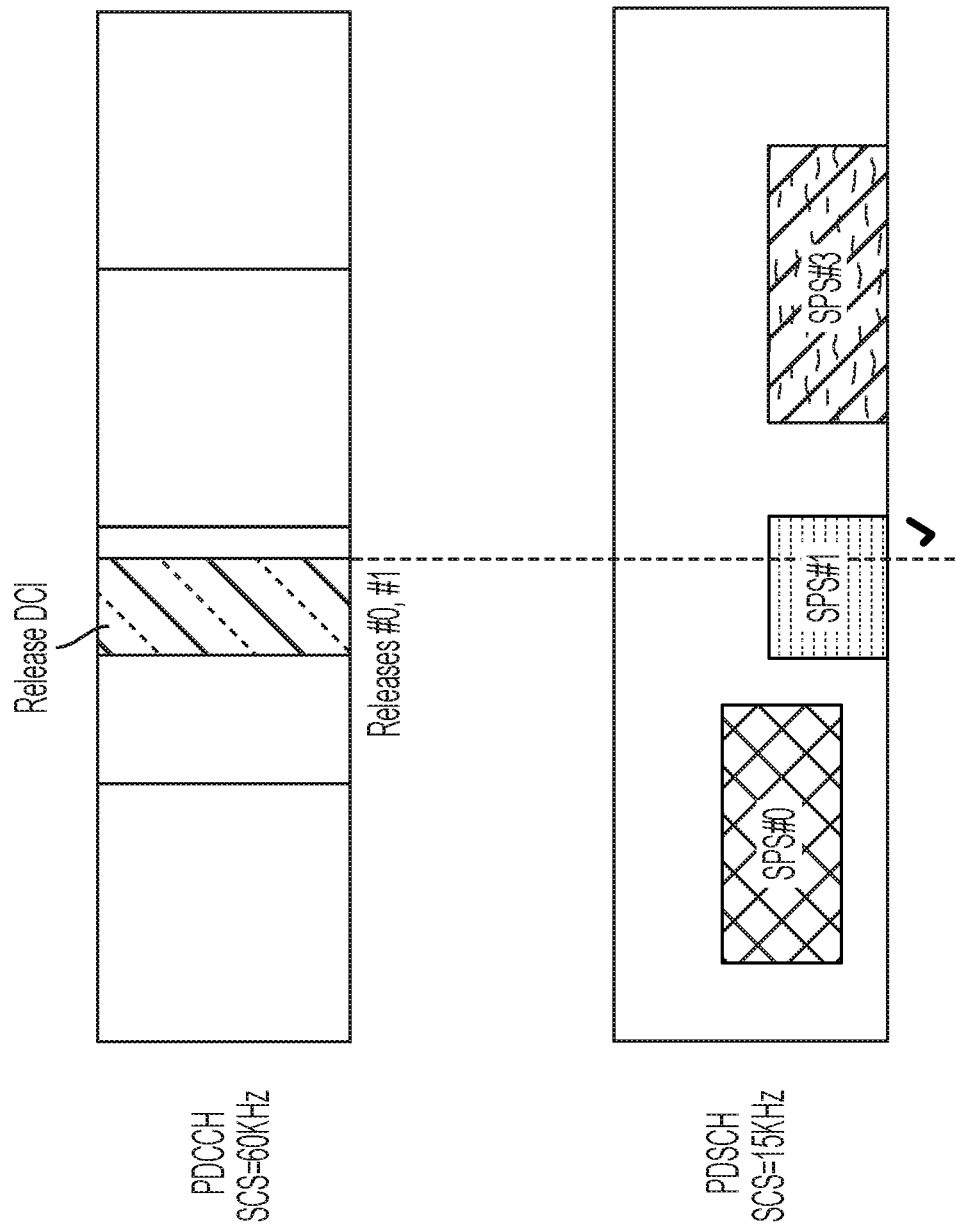
FIG. 7 illustrates another release PDCCH, according to some embodiments.

An example is shown in FIG. 7 where the release PDCCH indicates the release of SPS configuration indices 0 and 1. Assuming the same PUCCH resource for A/N of the release PDCCH and the indicated SPS PDSCHs, only SPS PDSCH #1 is considered to be released and UE is not expected to receive it. One bit A/N is generated for the set of released SPS PDSCH #1 and the release PDCCH. The A/N generation for the remaining SPS PDSCHs is unaltered by the release PDCCH. The following methods may be utilized:

Method 1-7: (Only SPS PDSCHs that end after the end of the release PDCCH are released; PDSCH slot). TS 38.213 supports the reception of an SPS release PDCCH in a PDCCH slot indicating the release of SPS PDSCH configurations indices $i_1, i_2, \ldots, i_N$ ($N \geq 1$) on the SPS PDSCH cell such that 1) $M \leq N$ SPS PDSCH configuration indices $j_1, j_2, \ldots, j_M$ where $\{j_1, j_2, \ldots, j_M\} \subseteq \{i_1, i_2, \ldots, i_N\}$ are configured to be received in the PDSCH slot where the PDSCH slot is the PDSCH slot that contains or overlaps with the ending symbol of the PDCCH and 2) ACK/NACK of the release PDCCH and $L \leq M$ SPS PDSCHs are mapped to the same PUCCH.

In this case, the SPS release PDCCH is only applicable to $R \leq L$ SPS PDSCHs for which the end of the ending symbol of the PDSCH is not before the end of the ending symbol of release PDCCH. These SPS PDSCHs are considered as released and UE is not expected to receive them within the PDSCH slot.

1 bit A/N is generated for the SPS release PDCCH and the R released SPS PDSCHs.

UE is expected to receive the SPS PDSCHs whose ending symbol ends before the ending symbol of the release PDCCH.

Method 1-8: (Only SPS PDSCHs that end after the end of the release PDCCH are released; PDCCH slot) TS 38.213 supports the reception of an SPS release PDCCH in a PDCCH slot indicating the release of SPS PDSCH configurations indices $i_1, i_2, \ldots, i_N$ ($N \geq 1$) on the SPS PDSCH cell such that 1) $M \leq N$ SPS PDSCH configuration indices $j_1, j_2, \ldots, j_M$ where $\{j_1, j_2, \ldots, j_M\} \subseteq \{i_1, i_2, \ldots, i_N\}$ are configured to be received in all of the PDSCH slots that overlap with the PDCCH slot and 2) ACK/NACK of the release PDCCH and the $L \leq M$ SPS PDSCHs are mapped to the same PUCCH.

In this case, the SPS release PDCCH is only applicable to $R \leq L$ SPS PDSCHs for which the end of the ending symbol of the PDSCH is not before the end of the ending symbol of release PDCCH. These SPS PDSCHs are considered as released and UE is not expected to receive them within the PDSCH slots.

1 bit A/N is generated for the SPS release PDCCH and the R released SPS PDSCHs.

UE is expected to receive the SPS PDSCHs whose ending symbol ends before the ending symbol of the release PDCCH.

Method 1-9 (Alternatives to Methods 1-5 to 1-8): With any of Methods 1-5 to 1-8, all the indicated SPS configurations that are received after the ending symbol of the release PDCCH and whose A/N bits are mapped to the same PUCCH as the release PDCCH are considered as released. 1 bit A/N is generated for the release PDCCH and the set of released PDSCHs. UE is expected to receive all the other indicated SPS PDSCHs.

Methods 1-5 to 1-9 determine which indicated SPS PDSCHs are actually released and which ones are expected to be received by UE in spite of being indicted as released. There could be that some of the originally indicated SPS PDSCHs are expected to be received by UE. In this case, it must be ensured that a location for reporting A/N of those received SPS PDSCHs is provided. The following methods serve to this end.

Method B-1: (Error case for A/N location unavailable) When Type-1 HARQ-ACK codebook is configured, with any of the methods 1-5 to 1-8, UE expects that there is one A/N bit location available for the SPS PDCCH release and the actually released SPS PDSCHs, i.e. the R SPS PDSCHs, and there are A/N bit locations available for each of the remaining received SPS PDSCHs.

Method B-2: (New interpretation of the indicated SPS PDSCH configuration indices in the SPS release PDCCH) When Type-1 HARQ-ACK codebook is configured, with any of the methods 1-5 to 1-8, for the purpose of determination of A/N bits for the release PDCCH, UE assumes that only SPS configuration indices of the actually released SPS PDSCHs, i.e. the R SPS PDSCHs, are present in the release PDCCH. The location of A/N of the release PDCCH and the R released PDSCHs, is determined from the start and length indicator value (SLIV) of the SPS PDSCH with the lowest configuration index among the R SPS PDSCHs. The A/N location for the remaining SPS PDSCHs are determined assuming they are received. Any of the remaining SPS PDSCH whose SLIV is in the same type-1 CB subgroup as that of the release PDCCH is not received by UE. No A/N bit is generated for such SPS PDSCHs.

Next we address SPS PDSCH release with aggregation factor, in particular the case where the SPS release PDCCH overlaps with a single occasion of an SPS PDSCH with aggregation factor. In that case, some of the SPS PDSCH occasions will end before the end of the release PDCCH while some others will end after the end of the release PDCCH. Since one A/N is generated for the entire SPS PDSCH reception, if the A/N for PDSCH and release PDCCH are mapped to the same PUCCH, this scenario may be disallowed by TS 38.213. Not supporting this scenario will significantly reduce the network flexibility to release the SPS PDSCH with aggregation factor. A similar scenario is when the cross carrier (X-CC) SPS release PDCCH releases an SPS PDSCH configuration on a cell with larger numerology. The following figures show examples.

Figure 8:
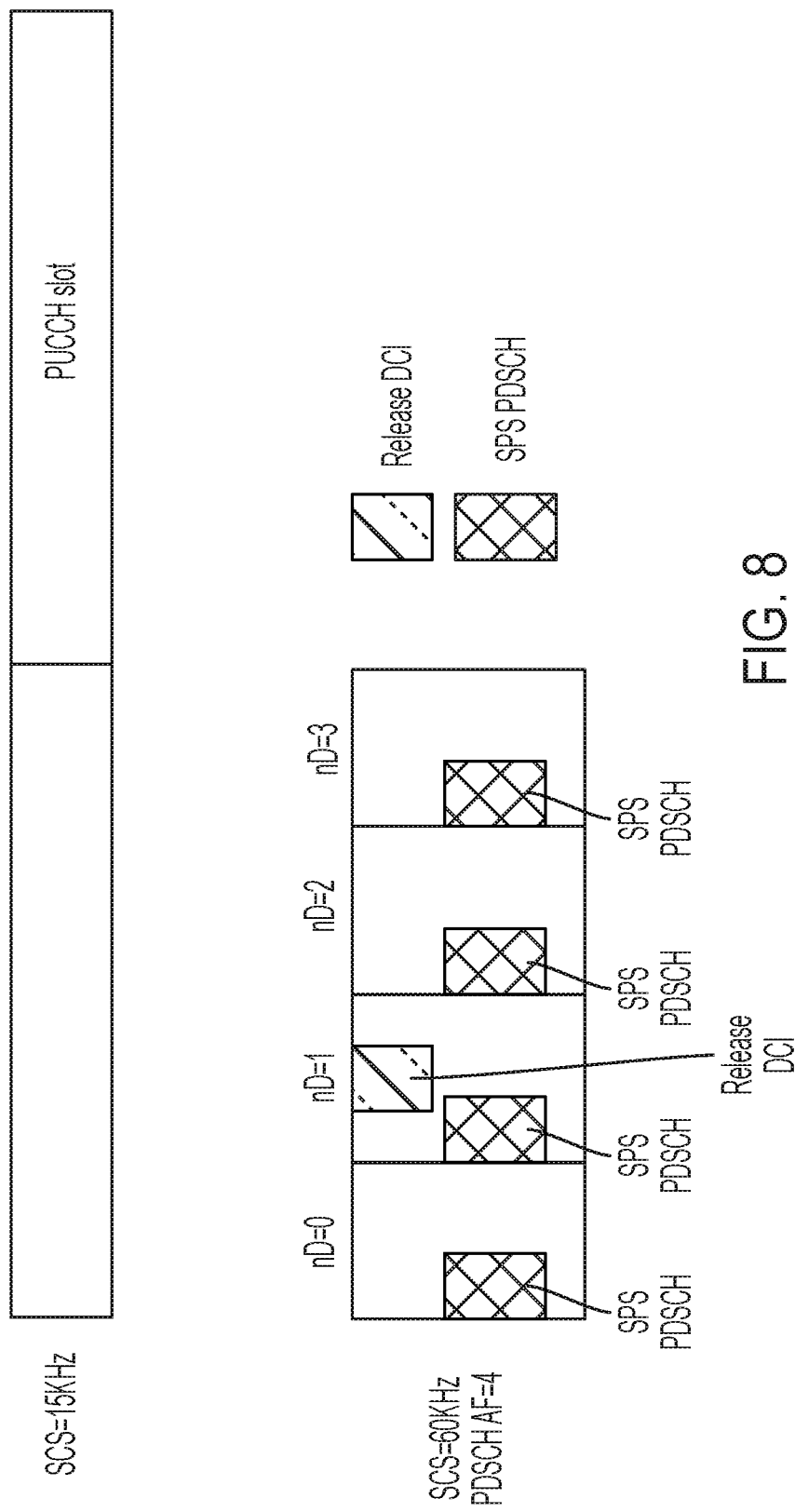
FIG. 8 illustrates an example where the release PDCCH is transmitted in the second PDSCH slot to release the SPS configuration, according to some embodiments.

FIG. 8 depicts an example where release PDCCH is transmitted in the second PDSCH slot to release the SPS configuration. Assuming that $K_1=1$ for SPS PDSCH and $K=1$ for the release PDCCH. This scenario is practically identical to the case where the PDSCH is received in the fourth slot, which should put no burden on UE. Therefore this scenario may be allowed by TS 38.213.

Figure 9:
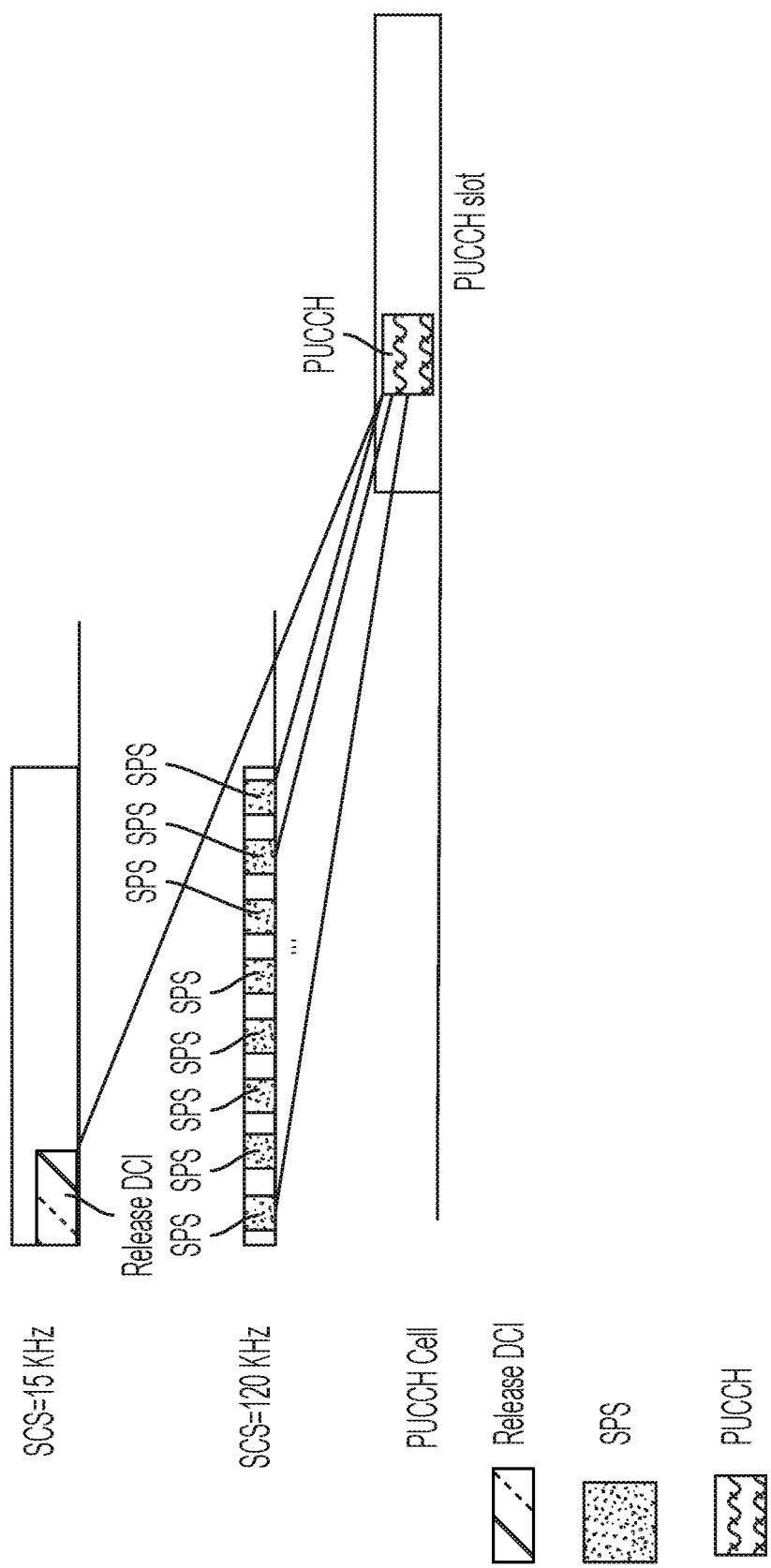
FIG. 9 illustrates an example where a release PDCCH is transmitted on a different cell than the PDSCH cell, according to some embodiments.

FIG. 9 depicts another example where the release PDCCH is transmitted on a different cell than the PDSCH cell, i.e. an X-CC scheduling scenario. In this case if the numerology of scheduling cell is less than that of scheduled cell and the SPS PDSCH periodicity is small, e.g. one slot, it may be the case that one SPS PDSCH ends before the end of the release PDCCH while the next SPS PDSCH ends after the end of the PDCCH. Assuming that all the A/N of all of the SPS PDSCHs and that of the release PDCCH are mapped to the same PUCCH, the scenario may not be optimal if the "slot" refers to the PDCCH slot, while it may be a typical use case of X-CC scheduling with different numerologies. A similar scenario holds when the numerology of scheduling cell is larger than that of scheduled cell.

As mentioned before, in the case of SPS PDSCH with aggregation factor disallowing the release PDCCH after the end of an SPS PDSCH occasion may put significant restriction on network. Therefore, it beneficial that the release PDCCH ends after the end of an SPS PDSCH occasion within the repetition if the SPS PDSCH occasion is not the last one. The following describes example methods to this end.

Method 2-0: (The last SPS PDSCH occasion among the SPS PDSCH with repetition is considered to determine the release SPS PDSCHs) With any of the methods for Problem #1, if the indicated SPS PDSCH configurations are configured with an aggregation factor $AF \geq 1$, only to determine the UE behavior, an SPS PDSCH configuration with $AF \geq 1$ is only considered as configured to be received in the last slot among the $J \leq AF$ slots.

In case of semi-static time division duplexing (TDD) uplink (UL)/downlink (DL) configuration, J slots are determined as the slots among the AF slots in which the SPS PDSCH occasion does not overlap with any UL symbol.

All the methods related to Problem #1 may be applied for X-CC scenario.

All the methods related to Problem #1 may also be applied to single release by considering N=1.

Although method 2-0 applies to PDSCH receptions with any number of repetitions, the behavior for one specific case is described in more detail below, namely, a single SPS release and an SPS PDSCH with aggregation factor.

Method 2-1: (single SPS release with SPS PDSCH aggregation factor) TS 38.213 supports the reception of a release PDCCH in a PDCCH slot indicating the release of an SPS PDSCH configured with an aggregation factor AF≥1 on the PDSCH cell such that 1) at least for one occasion among J≤AF occasions of the SPS PDSCH, the end of a last symbol of the PDCCH reception is not after the end of a last symbol of the SPS PDSCH occasion reception where the J occasions are determined after resolving conflict with TDD UL/DL configuration and 2) A/N of the SPS PDCCH release and A/N of the SPS PDSCH would be mapped to the same PUCCH. In this case, the SPS PDSCH is considered as released 1 bit A/N is generated for the SPS release PDCCH and the SPS PDSCHs, if type-1 HARQ-ACK codebook is configured and the location of A/N for the release PDCCH and the SPS PDSCH are the same in the codebook The 1 bit A/N is generated for the SPS release PDCCH.

Figure 10:
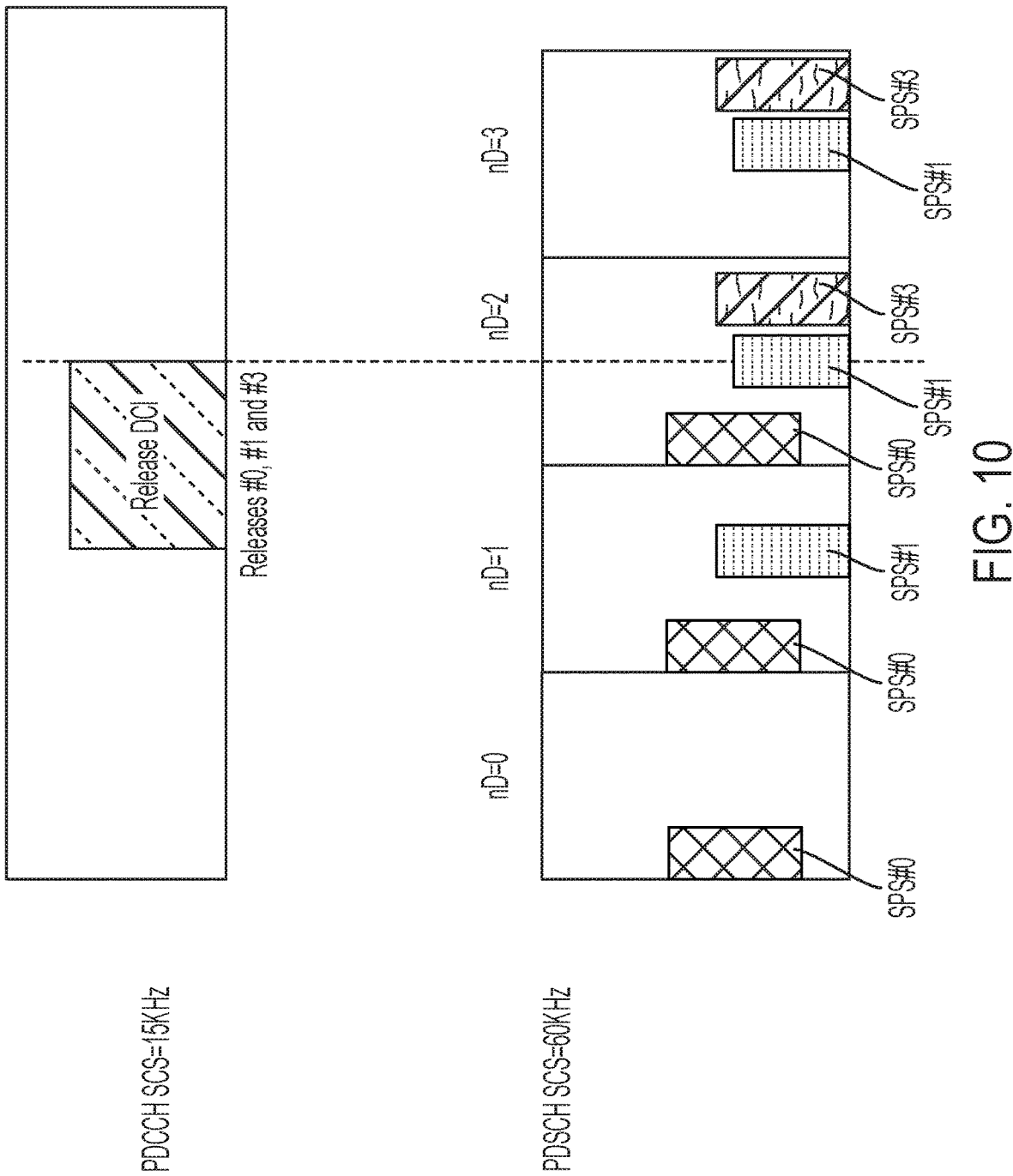
FIG. 10 illustrates an example where the release PDCCH indicates the release of SPS PDSCH configuration indices, according to some embodiments.

If Type-2 HARQ-ACK codebook is configured, UE is expected to generate 2 A/N bits, one for the release PDCCH and one for the SPS PDSCH regardless of whether UE detects the release PDCCH or not In FIG. 10, an example is shown below where the release PDCCH indicates the release of SPS PDSCH configuration indices 0, 1 and 2. Assume Method 1-5 is adopted and SPS configuration with indices 0, 1 and 2 are configured with aggregation factor of 4, 3 and 2 respectively. According to the above method, only SPS configuration #1 and #3 is considered as released.

With Type-2 HARQ-ACK CB, there may not be a collision between the A/N of the PDCCH and that of the SPS PDSCH. In that case, the restriction on mapping to the same PUCCH may not be needed.

Method 2-2: (single SPS release with SPS PDSCH aggregation factor) TS 38.213 supports the reception of a release PDCCH in a PDCCH slot indicating the release of an SPS PDSCH configured with an aggregation factor AF≥1 on the PDSCH cell such that 1) at least for one occasion among J≤AF occasions of the SPS PDSCH, the end of a last symbol of the PDCCH reception is not after the end of a last symbol of the SPS PDSCH occasion reception where the J occasions are determined after resolving conflict with TDD UL/DL configuration and 2) A/N of the SPS PDCCH release and A/N of the SPS PDSCH would be mapped to the same PUCCH. In this case, the SPS PDSCH is considered as released. The UE is not expected to receive the PDSCH occasions that end after the PDCCH.

Below, a method to determine the SPS release behavior with the aggregation factor is described:

Method 2-3: TS 38.213 may not support that a release PDCCH is received in a PDCCH slot indicating the release of an SPS PDSCH configured with an aggregation factor AF≥1 on the PDSCH cell such that 1) at least for one occasion among the AF occasions of the SPS PDSCH, the end of a last symbol of the PDCCH reception is after the end of a last symbol of the SPS PDSCH occasion reception and 2) A/N of the SPS PDCCH release and A/N of the SPS PDSCH would be mapped to the same PUCCH.

In other words, it is beneficial for the release PDCCH to be received before the end of every SPS PDSCH occasions among the repetitions.

Figure 11:
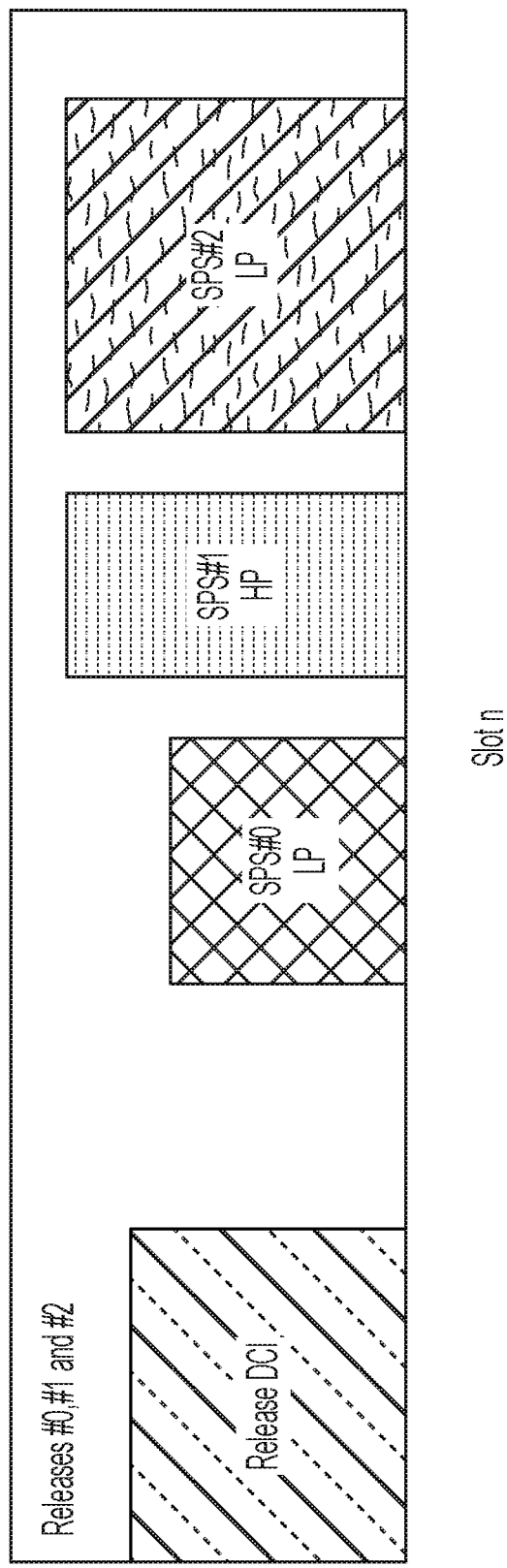
FIG. 11 illustrates an example of jointly released SPS configurations #0, #1 and #2, according to some embodiments.

The present application further discloses methods directed to priority determination for joint SPS release. To determine which A/N bits to multiplex in the first or second HARQ-ACK CB, UE may need to determine the priority of A/N. For SPS release PDCCH the priority is given by the SPS configuration. However, when the SPS release PDCCH jointly releases multiple SPS configurations, with different priorities, it may not be clear which priority should be applied for the A/N of the SPS release PDCCH. As an example, suppose PDCCH jointly releases SPS configurations #0, #1 and #2 with low, high and low priorities, respectively. In this case, should UE multiplex the A/N of the PDCCH into the low priority CB or the high priority one? Different UE behaviors may result in different A/N payload size and hence mismatch between UE and gNB, which can have negative impact on the reliability of PUCCH or can increase the implementation complexity due to necessity of blind decoding at gNB. FIG. 11 addresses this issue and provides different methods to determine UE behavior.

As one reasonable network behavior, the gNB may indicate to release the SPS configurations of the same priority in the joint release PDCCH:

Method 3-0: (Mixed release as an error case) UE is not expected to receive an SPS release PDCCH that indicates to jointly release M SPS configurations, if there are at least one SPS configuration with low priority and at least one SPS configuration with high priority among the M configurations. The priority of each SPS configuration is given via RRC by via a priority or HARQ-ACK codebook indicator.

The above method may put a restriction on the gNB as the network may need to release multiple SPS configurations of different priorities all at once. A different UE behavior can be defined by allowing the mixed priorities but explicitly indicating the A/N priority in the release PDCCH:

Method 3-1: (Explicit indication in DCI) gNB can jointly indicate to the UE to release multiple SPS configurations of same or different priorities in a PDCCH. gNB further indicates the A/N priority of the SPS release PDCCH with an explicit priority indicator field in the release PDCCH.

A different alternative can be considered based on the presence of at least one high priority SPS configurations in the release PDCCH. With this alternative, if at least one of the indicated SPS configurations is of high priority, the A/N is associated with high priority, otherwise A/N is of low priority:

Method 3-2: (At least one HP SPS configuration may be needed for HP A/N) gNB can jointly indicate to the UE to release multiple SPS configurations of same or different priorities in a PDCCH. If there is at least one SPS configuration with high priority among the SPS configurations that are indicated to be released by the PDCCH, the priority of A/N of the SPS release PDCCH is high, otherwise the priority is low.

Method 3-2, ensures the reliability of the SPS release A/N when at least one HP SPS is indicated to be released. This method provides a high level reliability for delivering the SPS release PDCCH A/N as it is multiplexed into the HP HARQ-ACK CB, which tends to be transmitted with higher PUCCH reliability. A less conservative approach is to only multiplex the SPS A/N into the HP HARQ-ACK CB if all of the indicated SPS configurations are of high priority.

Method 3-2: (All SPS configurations may need to be HP for HP A/N) gNB can jointly indicate to the UE to release multiple SPS configurations of same or different priorities in a PDCCH. If every SPS configuration among the SPS configurations indicated to be released is of high priority, the priority of A/N of the SPS release PDCCH is high, otherwise the priority is low.

It may also be possible to determine the priority of SPS PDCCH release A/N as low if at least one SPS configuration is of low priority. This method may be used when the priority of the other SPS PDSCHs among those indicated to be released are high, but the gNB does not require a high reliability for their A/N.

Method 3-3: (At least one LP SPS configuration may be needed for LP A/N) gNB can jointly indicate to the UE to release multiple SPS configurations of same or different priorities in a PDCCH. If there is at least one SPS configuration with low priority among the SPS configurations that are indicated to be released by the PDCCH, the priority of A/N of the SPS release PDCCH is low, otherwise the priority is high.

It may also be possible to determine the priority of SPS PDCCH release A/N based on the priority index given by a specific SPS configuration, e.g. SPS configuration with lowest index.

Method 3-4: (SPS configuration index) gNB can jointly indicate to the UE to release multiple SPS configurations of same or different priorities in a PDCCH. The priority of A/N of the SPS release PDCCH is determined according to the priority index given by the SPS configuration with lowest (or highest) configuration index among the indicated configurations to release.

Alternatively, the priority index can be determined based on a specific SPS configuration index among the indicated ones. For example, the SPS configuration indices can be sorted in ascending or descending order and then the i-th SPS configuration is chosen to determine the priority index of SPS A/N, where i is a pre-determined value, e.g. i=2, or is RRC configured.

A different alternative is to determine the priority index based on the priority indicated by the majority of SPS configurations, e.g. if 5 SPS configurations are indicated such that 3 configurations are HP and 2 are LP, the priority index is determined as HP. According to some embodiments, a threshold can be defined and the priority index is determined as HP if the number of indicated HP configurations are greater than the threshold.

Method 3-5: (Threshold method) gNB can jointly indicate to the UE to release multiple SPS configurations of same or different priorities in a PDCCH. The priority of A/N of the SPS release PDCCH is determined as follows.

If N SPS configurations are indicated to be released and at least K configurations are of high priority, then priority index is determined as high, otherwise it is determined as low. For each N the value of K is pre-determined or can be configured via RRC.

Alternatively, a percentage 0≤p≤1 is pre-determined or RRC configured. If there are at least $\lfloor pN \rfloor$ (or $\lceil pN \rceil$) configurations with high priority among the N indicated configurations, then the priority index is determined as high, otherwise it is low.

The above method can be also described by replacing "low" with "high" and vice versa.

One case of the above algorithm is when p=0.5 and is described as below.

Method 3-5-0: (Majority method) gNB can jointly indicate to the UE to release multiple SPS configurations of same or different priorities in a PDCCH. The priority of A/N of the SPS release PDCCH is determined as follows.

If the majority of the SPS configurations indicated by the PDCCH are of high priority, the priority index of SPS A/N is high, otherwise it is low. If the number of high priority configurations is equal to that of low priority configurations, the priority index is determined based on a pre-defined value, e.g. always high or low.

Finally, according to some embodiments, the priority index can be determined as HP if the number of indicated HP configurations among a specific group of indicated SPS configuration indices are greater than the threshold.

Method 3-6: (Threshold method within a group) gNB can jointly indicate to the UE to release multiple SPS configurations of same or different priorities in a PDCCH. The priority of A/N of the SPS release PDCCH is determined as follows. From the indicated SPS configurations, a group of configurations is formed, e.g. the M lowest or highest configuration indices.

If at least K configurations are of high priority, then priority index is determined as high, otherwise it is determined as low. For each M the value of K is pre-determined or can be configured via RRC.

Alternatively, a percentage 0≤p≤1 is pre-determined or RRC configured. If there are at least $\lfloor pM \rfloor$ (or $\lceil pM \rceil$) configurations with high priority among the M indicated configurations, then the priority index is determined as high, otherwise it is low One case of the above algorithm is when p=0.5. If the majority of the SPS configurations in the group are of high priority, the priority index is high, otherwise it is low. If the number of high priority configurations is equal to that of low priority configurations, the priority index is determined based on a pre-defined value, e.g. always high or low.

Issues may arise with SPS Release PDCCH repetition timeline and HARQ-ACK CB aspects. These issues are labeled as: "Problem #2."

Figure 12:
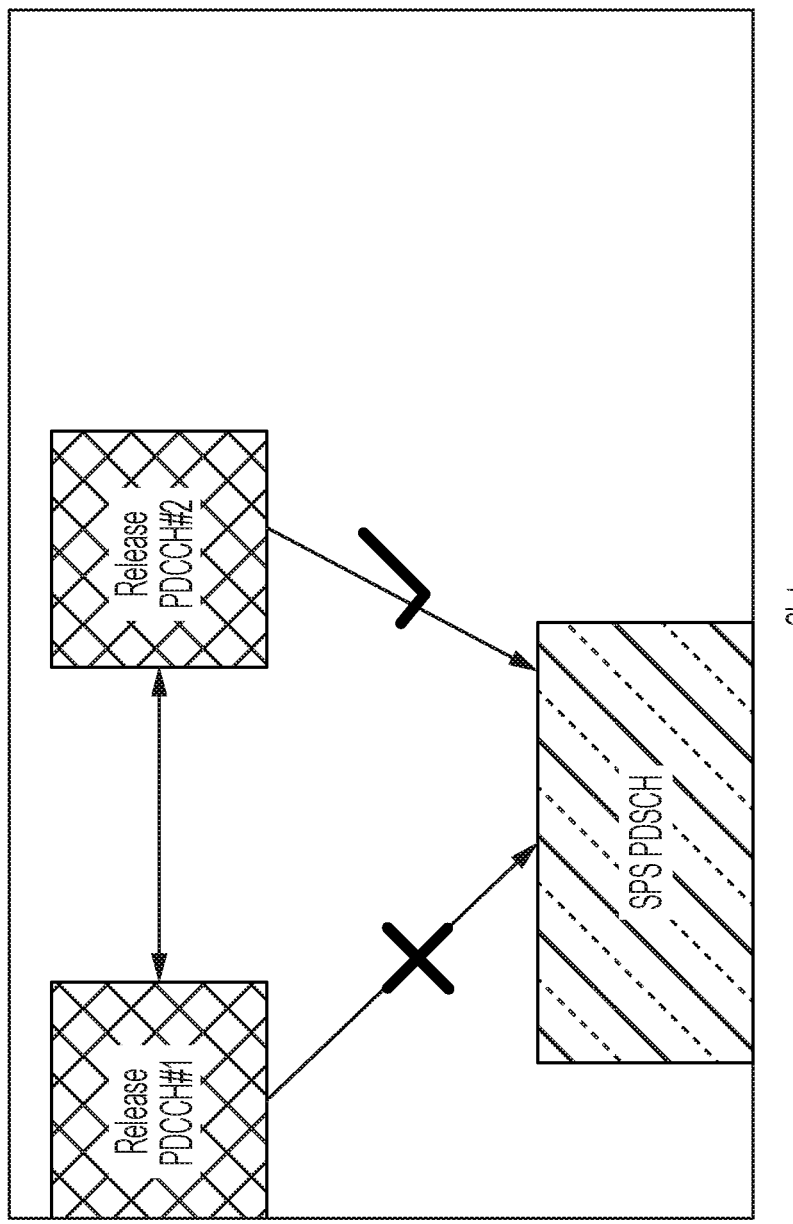
FIG. 12 illustrates a timeline for reception of SPS release and SPS PDSCH in the same slot, according to some embodiments.

FIG. 12 depicts a timeline for reception of SPS release and SPS PDSCH in the same slot, namely an embodiment where the SPS release PDCCH is transmitted via repetition with PDCCH repetition #1 and PDCCH repetition #2.

To enhance the reliability of DCI, the PDCCH carrying the DCI may be transmitted via repetition. PDCCH repetition may be utilized in Rel-17 multiple transmission reception point (multi-TRP) PDCCH enhancement, where two PDCCH candidates in two linked monitoring occasions of the same or different SS sets are linked together. The reliability of SPS release DCI is of crucial for uRLLC service types where due to introduction of multiple active SPS configurations in one cell, missing release PDCCHs are more likely and may cause misunderstanding between UE and gNB about the HARQ-ACK payload. Therefore, some embodiments may include SPS release PDCCH transmission via repetition.

The following may define the UE behavior for reception of SPS release PDCCH and the SPS PDSCH in the same slot, according to some embodiments.

Some embodiments may support the case that in a slot, the SPS release PDCCH is received before the end of the SPS PDSCH reception for the same SPS configuration corresponding to the SPS release PDCCH. For example, 1 bit HARQ-ACK may be generated for SPS release and the UE may not expect to receive the SPS PDSCH if HARQ-ACKs for the SPS release, and the SPS reception would map to the same PUCCH.

According to some embodiments, a UE may not receive an SPS release PDCCH in a slot after the end of the SPS PDSCH reception in the slot for the same SPS configuration corresponding to the SPS release PDCCH if HARQ-ACKs for the SPS release and the SPS reception would map to the same PUCCH.

The characteristics are for when the PDCCH is with single transmission, e.g. no repetition. With PDCCH repetition, an example of which is shown in the FIG. 12, UE behavior may be defined. The first PDCCH ends before the end of the PDSCH in the slot. However, the release PDCCH may not end after the end of the PDSCH, so only one PDCCH in FIG. 12 may be preferred. Therefore, UE behavior should be defined in this case. In the following methods, it is assumed the A/N of the SPS release PDCCH and that of the SPS PDSCH in the slot are mapped to the same PUCCH slot/sub-slot.

Method 4-0: (SPS release PDCCH repetition+SPS PDSCH in the same slot: the earliest PDCCH is the reference) If the SPS release PDCCH is transmitted via repetition with PDCCH repetition #1 and PDCCH repetition #2, where the PDCCH #1 ends before the end of PDCCH repetition #2, and the indicated SPS PDSCH is configured to be received in the same slot as the PDCCH, the earliest PDCCH repetition, i.e. PDCCH repetition #1 must end before the end of the SPS PDSCH.

The repetition #1 of the release PDCCH ends after the end of the SPS PDSCH may be restricted in some embodiments.

When the repetition #1 ends before the end of the SPS PDSCH, UE is not expected to receive the SPS PDSCH.

Requiring the earliest PDCCH repetition to be received before the end of the PDSCH may provide the network with flexibility on when to transmit the PDCCH. According to this scheme, the second repetition may still end after the end of the PDSCH. If the DCI happens to be successfully decoded only after the end of the second repetition, e.g. with soft combining, it may stress SPS A/N preparation timeline, therefore one may argue that network should send both repetitions before the end of the SPS PDSCH in the slot.

Method 4-1: (SPS release PDCCH repetition+SPS PDSCH in the same slot: the latest PDCCH is the reference) If the SPS release PDCCH is transmitted via repetition with PDCCH repetition #1 and PDCCH repetition #2, where the PDCCH #1 ends before the end of PDCCH repetition #2, and the indicated SPS PDSCH is configured to be received in the same slot as the PDCCH, the latest PDCCH repetition, i.e. PDCCH repetition #2 must end before the end of the SPS PDSCH.

The repetition #2 of the release PDCCH ending after the end of the SPS PDSCH may be restricted in some embodiments.

When the repetition #2 ends before the end of the SPS PDSCH, UE is not expected to receive the SPS PDSCH.

Figure 13:
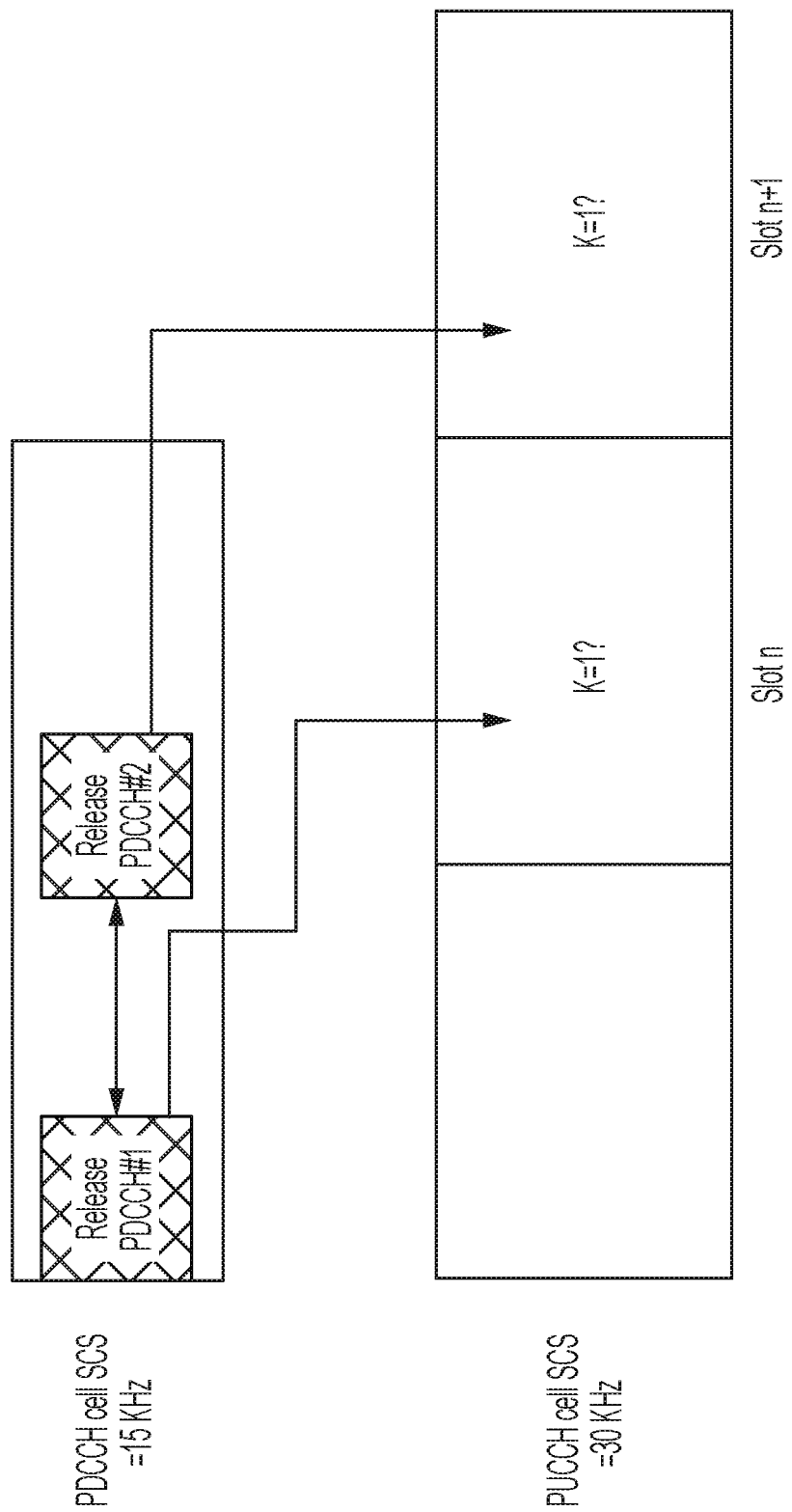
FIG. 13 illustrates an SPS release PDCCH with repetition HARQ-ACK reporting timeline, according to some embodiments.

FIG. 13 depicts an SPS release PDCCH with repetition HARQ-ACK reporting timeline. In Rel-15/16, the A/N timing of the SPS release PDCCH is defined in the release PDCCH, and is counted in the number of slots in the PUCCH cell numerology, from the UL slot that contains the end of the ending symbol of the release PDCCH to the PUCCH slot. With PDCCH repetition, PUCCH slot determination may need further clarification. Assuming an indication of slot offset K=1 in the release DCI, if the repetition #1 is considered as the reference PDCCH, slot n and if the repetition #2 is considered as the reference, slot n+1 will be determined as PUCCH slot. Therefore, a reference PDCCH repetition may be utilized to determine the A/N timing for the release PDCCH.

Repetition #1 may be defined as the repetition that ends before the end of the repetition #2. In one embodiment, the A/N timing of the release PDCCH is determined based on the Repetition #1. With this method, relatively fast A/N reporting may be possible. However, UE may need to decode the second PDCCH repetition to enjoy diversity and improved reliability for the DCI. Therefore, in another embodiment, A/N timing of the release PDCCH is determined based on repetition #2. In more detail:

With reference to slots for PUCCH transmissions, if the UE detects a DCI format indicating an SPS PDSCH release through a PDCCH reception ending in slot n, the UE provides corresponding HARQ-ACK information in a PUCCH transmission within slot n+k, where k is a number of slots and is indicated by the PDSCH-to-HARQ feedback timing indicator field in the DCI format, if present, or provided by RRC. k=0 corresponds to the last slot of the PUCCH transmission that overlaps with the reference PDCCH reception, i.e. PDCCH repetition #1/#2.

The aforementioned timeline definition can be applied to other cases in which A/N is reported for a PDCCH that does not schedule a PDSCH and the A/N timeline is defined from the PDCCH. Some examples include DCI indicating secondary cell (Scell) dormancy without scheduling a PDSCH, or requesting Type-3 HARQ-ACK CB without scheduling a PDSCH.

Figure 14:
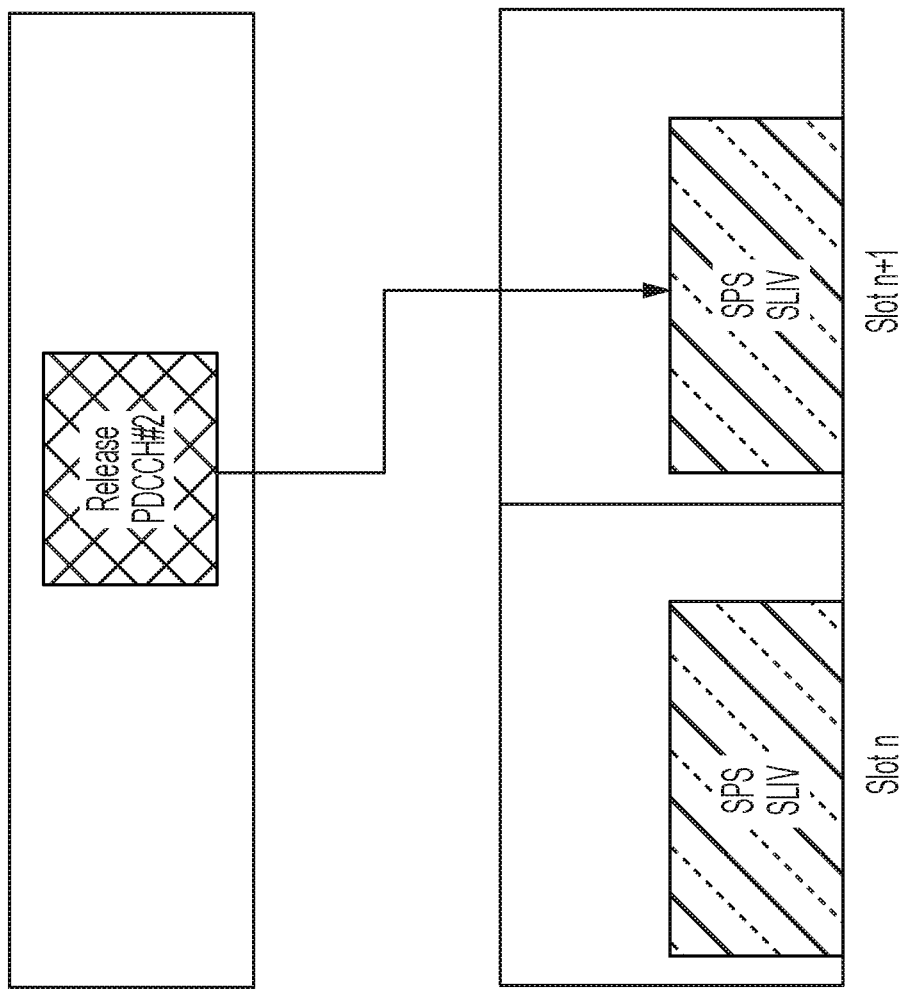
FIG. 14 illustrates an SPS release PDCCH with repetition in Type-1 HARQ-ACK CB, according to some embodiments.

FIG. 14 depicts an SPS release PDCCH with repetition in Type-1 HARQ-ACK CB. Consideration may be needed with SPS release PDCCH when semi-static, or Type-1 HARQ-ACK CB is configured. In Rel-16, the location of the A/N of the release PDCCH in a slot is determined to be the SLIV of the SPS PDSCH reception in the PDSCH slot. When the release PDCCH is transmitted via repetition, there can be two PDSCH slots corresponding to each PDCCH repetition. The PDSCH slot to consider may be defined for establishing common understanding between UE and gNB on the HARQ-ACK payload. First we define the behavior for non-repetition and SPS release with different numerology of the PDCCH and the SPS PDSCH.

Method 4-2: (SPS release PDCCH+SPS PDSCH in type-1 HARQ-ACK CB)—A location in the Type-1 HARQ-ACK codebook for HARQ-ACK information corresponding to SPS PDSCH release by a single DCI is same as for a corresponding SPS PDSCH reception SLIV in the latest slot of the SPS PDSCH cell that overlaps with the release PDCCH.

The following figure shows an example, where the A/N for the SPS release PDCCH is placed in the SLIV of the SPS PDSCH in slot n+1.

Alternatively, the earliest slot of the SPS PDSCH cell that overlaps with the release PDCCH can be used for location of HARQ-ACK bit of the release PDCCH in Type-1 HARQ-ACK CB.

In case of SPS release PDCCH repetition, different repetitions may overlap with different PDSCH slots. Reporting the A/N in the two locations in lost n and n+1 may seem reductant. Moreover, if gNB intends to schedule a DG PDSCH in one of the slots, e.g. slot n, there will be no location for the A/N, therefore the DG PDSCH may not be scheduled. Alternatively UE may report the release PDCCH A/N in both locations.

Figure 15:
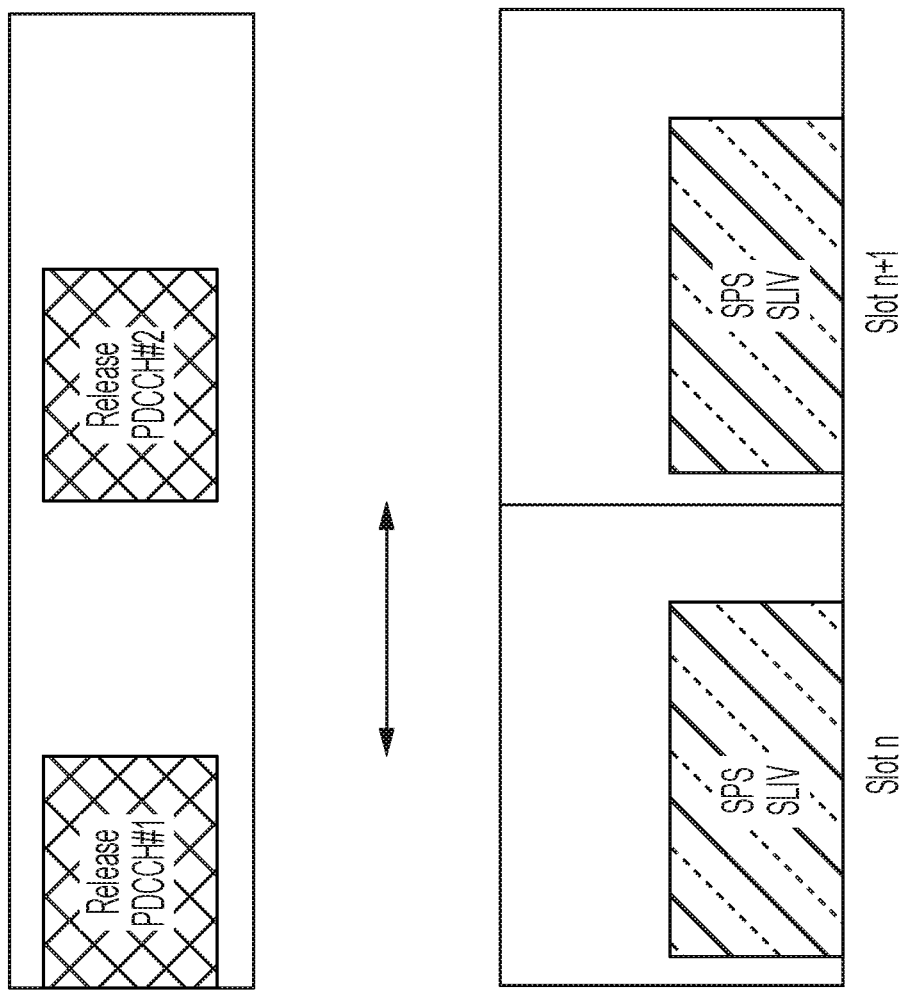
FIG. 15 illustrates an SPS release PDCCH repetition+SPS PDSCH in type-1 HARQ-ACK CB, according to some embodiments.
Figure 15:
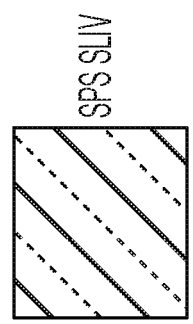

FIG. 15 depicts an SPS release PDCCH repetition+SPS PDSCH in type-1 HARQ-ACK CB. For example, Method 4-3: A location in the Type-1 HARQ-ACK codebook for HARQ-ACK information corresponding to SPS PDSCH release by transmission via PDCCH repetition 1 and 2, is same as for a corresponding SPS PDSCH reception SLIV in the latest slot of the SPS PDSCH cell that overlaps with the release PDCCH repetition #2. Repetition #1 is the repetition that ends earlier than the end of the repetition #2. In other words, only one A/N bit is generated for the repeated SPS release PDCCH and is placed in the location of the SPS PDSCH reception in the latest slot of the SPS PDSCH cell that overlaps with the latest repetition of the release PDCCH.

According to Method 4-3, the location of the A/N of the SPS release PDCCH in the figure below is slot n+1. As mentioned alternatively, UE may report the A/N in the latest PDSCH slot that overlaps with the earliest PDCCH, or it can report the A/N in both of the slots. In these cases, UE reports the A/N in the location in slot n or both slot n and n+1, respectively.

Alternatively, earliest PDCCH repetition and/or earliest slot of the SPS PDSCH cell may be used to determine the location of the A/N of the release PDCCH in Type-1 HARQ-ACK CB.

Method 4-4: A location in the Type-1 HARQ-ACK codebook for HARQ-ACK information corresponding to SPS PDSCH release by transmission via PDCCH repetition 1 and 2, is same as for a corresponding SPS PDSCH reception SLIV in the latest slot of the SPS PDSCH cell that overlaps with the release PDCCH repetition #1.

Repetition #1 is the repetition that ends earlier than the end of the repetition #2.

In other words, only one A/N bit is generated for the repeated SPS release PDCCH and is placed in the location of the SPS PDSCH reception in the latest slot of the SPS PDSCH cell that overlaps with the earliest repetition of the release PDCCH.

Method 4-5: A location in the Type-1 HARQ-ACK codebook for HARQ-ACK information corresponding to SPS PDSCH release by transmission via PDCCH repetition 1 and 2, is same as for a corresponding SPS PDSCH reception SLIV in the earliest slot of the SPS PDSCH cell that overlaps with the release PDCCH repetition #1.

Repetition #1 is the repetition that ends earlier than the end of the repetition #2.

In other words, only one A/N bit is generated for the repeated SPS release PDCCH and is placed in the location of the SPS PDSCH reception in the earliest slot of the SPS PDSCH cell that overlaps with the earliest repetition of the release PDCCH.

Method 4-6: A location in the Type-1 HARQ-ACK codebook for HARQ-ACK information corresponding to SPS PDSCH release by transmission via PDCCH repetition 1 and 2, is same as for a corresponding SPS PDSCH reception SLIV in the earliest slot of the SPS PDSCH cell that overlaps with the release PDCCH repetition #2.

Repetition #1 is the repetition that ends earlier than the end of the repetition #2.

In other words, only one A/N bit is generated for the repeated SPS release PDCCH and is placed in the location of the SPS PDSCH reception in the earliest slot of the SPS PDSCH cell that overlaps with the latest repetition of the release PDCCH.

Issues may arise with SPS Release+Fallback mode of Type-1 HARQ-ACK CB. These issues are labeled as "Problem #3."

In Rel-15, with Type-1 HARQ-ACK CB, there is a fallback behavior that may be described as shown below.

If a UE reports HARQ-ACK information in a PUCCH only for
  an SPS PDSCH release indicated by DCI format 1_0 with counter downlink assignment indicator (C-DAT) field value of 1, or
  a PDSCH reception scheduled by DCI format 1_0 with counter DAT field value of 1 on the PCell, or
  SPS PDSCH reception(s)
within the $M_{A,c}$ occasions for candidate PDSCH receptions as determined in Clause 9.1.2.1, the UE determines a HARQ-ACK codebook only for the SPS PDSCH release or only for the PDSCH reception or only for one SPS PDSCH reception according to corresponding $M_{A,c}$ occasion(s) on respective serving cell(s), where the value of counter DAT in DCI format 1_0 is according to Table 9.1.3-1 and HARQ-ACK information bits in response to mor than one SPS PDSCH receptions that the UE is configured to receive are ordered according to the following pseudo-code.

Without the fallback behavior, the HARQ-ACK reporting may become inefficient. In particular, assume that gNB transmit a release PDCCH whose A/N is to be sent in a PUCCH in slot n, and assume that there is no other A/N reporting in slot n, i.e. no DG or SPS PDSCH or any other channels of any type. If UE runs the Type-1 HARQ-ACK CB pseudo-code, it will end up including many NACK values in the CB, which unnecessarily increases the payload size. With fallback operation, in this example, gNB may indicate to the UE via a value of the counter downlink assignment indicator (C-DAI), wherein C-DAI=1 in the release DCI format, to not run the pseudo-code and only report the A/N of the release PDCCH.

With the introduction of multiple active SPS configurations in Rel-16, the above purpose is defeated when gNB releases multiple SPS PDSCH configurations via separate DCIs. As an example, suppose gNB transmits two separate DCIs to release SPS configuration 1 and SPS configuration 2 such that the A/N bits are mapped to the same PUCCH slot. If gNB indicates a value of C-DAI=1 in both of them, according to the above, UE only includes A/N of one of the SPS release PDCCHs. Without any change the fallback behavior for Type-1 HARQ-ACK cannot operate with multiple SPS release PDCCHs in a HARQ-ACK CB.

Figure 16:
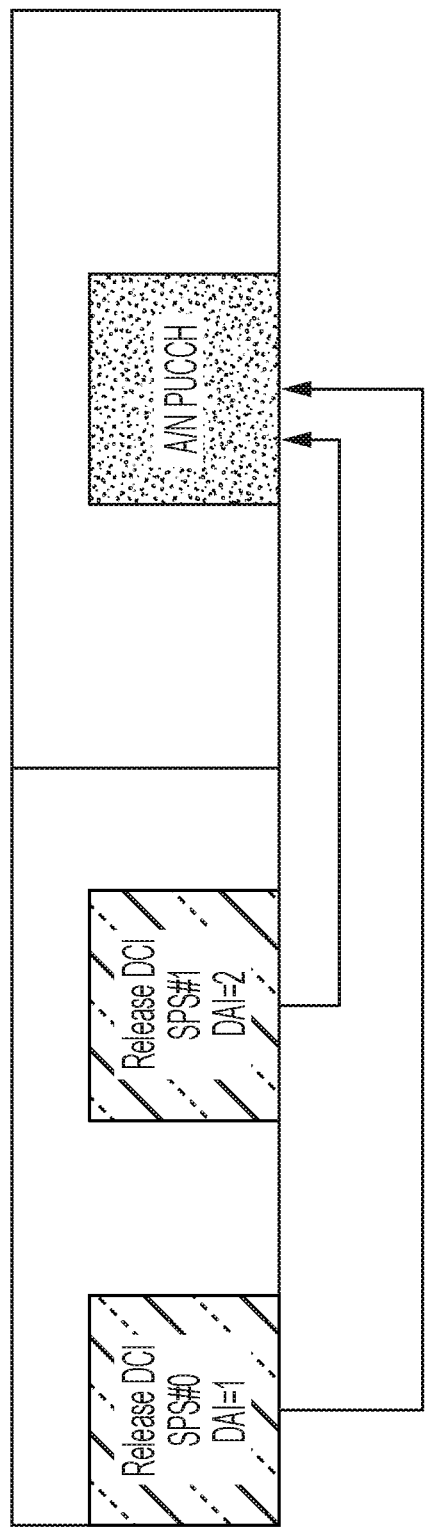
FIG. 16 illustrates a Type-1 HARQ-ACK CB and release PDCCH C-DAI operation, according to some embodiments.

FIG. 16 depicts a Type-1 HARQ-ACK CB and release PDCCH C-DAI operation.

Some embodiments may generalize the fallback behavior to multiple SPS release PDCCHs by allowing larger values of C-DAI that only counts the release PDCCHs as in Type-2 CB. For example, when two SPS release PDCCHs are mapped to the PUCCH, gNB may indicate the C-DAI values for 1 and 2 in the two DCIs respectively. If UE receives the second DCI, it will know that two release PDCCHs have been sent by gNB, so it includes two A/N bits. However, specific values of C-DAI may be used only to indicate to the UE that it is in fallback mode, so that it does not run the Type-1 pseudo-code. For example with two bit of C-DAI field, values C-DAI=1 and 2 may be used for counting the number of SPS release PDCCHs and indicating a fallback mode, i.e. UE doesn't run the Type-1 HARQ-ACK CB pseudo-code, while values of C-DAI=3 and 4 may be used to count the number of release PDCCHs while indicating the UE is NOT in the fallback mode; in this case a value of 3 and 4 indicate 1 and 2 DCIs have been sent by gNB, respectively.

Method 5-0 (Type-1 HARQ-ACK CB and release PDCCH C-DAI operation)—When UE is configured with Type-1 HARQ-ACK CB, the number of SPS release PDCCHs whose A/N is sent in the PUCCH slot, is indicated to the UE via the value of C-DAI in the DCI format indicating the release. C-DAI indicates the accumulative number of serving cell and monitoring occasion (MO) indices similar to Rel-15/16, given in TS 38.213. A UE may be configured with search space (SS) for PDCCH monitoring in a slot. The SS configuration indicates to the UE which symbols the UE monitors the PDCCH on. For example, the SS can be associated with a control resource set (CORESET) length of 3 symbols on symbols 4, 5, and 6. Then the UE monitors the PDCCH candidates of length-3 symbols on symbol 4, 5 and 6. In the above example, there is an MO on symbols 4, 5 and 6.

With a release PDCCH, gNB further indicates to the UE whether it should only transmit the A/N of the release PDCCHs or it should include A/Ns according to the Type-1 CB, when UE only has A/N for the release PDCCHs to report. The indication can be via any of the following alternatives:

Alt 1: 1 extra bit in the SPS release PDCCH carrying the DCI format. A value of 0 (or 1) indicates to the UE that it must only include the SPS release A/N. The other value indicates that UE should run the Type-1 HARQ-ACK CB fully.

Alt 2: with no total downlink assignment indicator (T-DAI) filed field in the SPS release DCI, and a bitwidth of m bits for C-DAI, C-DAI values of 1 to $2^{m-1}$ indicate fallback mode while other values indicate non-fallback mode.

Alt 3: with T-DAI field present in the release PDCCH DCI, one bit of the T-DAI field is used to indicate the fallback or non-fallback behavior.

With Alt 2, a C-DAI values i larger than $2^{m-1}$ indicate i–$2^{m-1}$ release PDCCHs transmitted by gNB whose A/Ns are in the same PUCCH. The order in which C-DAI counts these PDCCHs is according to the Type-2 HARQ-ACK CB.

The aforementioned method, essentially runs a Type-2 HARQ-ACK CB for the SPS release PDCCHs, with additional indication to the UE as to whether or not it should determine the A/N payload according to the Type-1 HARQ-ACK CB or the fallback mode, i.e. only A/N of the SPS release PDCCHs determined according to the Type-2 CB based on the DAI values, when UE only has A/Ns for the SPS release PDCCHs to report.

In essence, the above method can be generalized to include other DCIs, such as DCIs that do not schedule a PDSCH. Some examples include Scell dormancy indicting DCI, DCI that requests Type-3 HARQ-ACK feedback. In this case, C-DAI and T-DAI, if any, count the accumulative number of SPS release PDCCH, Scell dormancy PDCCH, and type-3 CB requesting PDCCH up to certain serving cells and monitoring occasions, similar to Rel-15.

Issues may arise with SPS Release PDCCH+Type-2 CB and multiple PDSCHs scheduled in the same MO index. These issues are designated as "Problem #4."

In Rel-16, multiple DCIs may be transmitted by gNB in one MO index m, defined according to Type-2 HARQ-ACK CB, and one scheduling cell, to schedule multiple PDSCHs on a scheduled cell whose A/N bits are mapped to the same PUCCH. The ordering of C-DAI in this case, is according to the start time of the scheduled PDSCHs.

In case of other DCIs, such as SPS release DCI, the DCI does not schedule a PDSCH. If an SPS release PDCCH is transmitted in MO index m and scheduling cell c' indicating the release of an SPS PDSCH in cell c and there are one or more DCIs in the same MO index and scheduling cell scheduling PDSCH(s) on the scheduled cell c, and A/N of all the PDSCHs and the PDCCH are mapped to the same PUCCH, the ordering among the DCIs or C-DAIs may need to be defined.

In one embodiment, the C-DAI I incremented in ascending order of the start time of the scheduled PDSCHs, where the release PDCCH is assumed to be associated (have scheduled) a PDSCH whose SLIV is in the latest PDSCH slot that overlaps with the PDCCH. C-DAI values are incremented in ascending order of the start time of the PDSCHs and the associated PDSCH for the release PDCCH.

In another embodiment, C-DAI of the PDSCH with earliest start time is more than the C-DAI of the release PDCCH by a value of 1. In another embodiment, C-DAI of the release PDCCH is more than the C-DAI of the PDSCH with the latest start time by a value of one.

Similar rules may be defined to allow receptions of Scell dormancy indication DCI or the DCI requesting Type-3 HARQ-ACK CB.

In another embodiment, UE is not expected to receive in MO index m on a scheduling cell c' an SPS release PDCCH that indicates the release of an SPS PDSCH configuration on cell c, if UE also receives a DCI in the same MO index and scheduling cell that schedules a DG PDSCH on cell c and the A/N of the PDCCH and the PDSCH are mapped to the same PUCCH slot.

Figure 17:
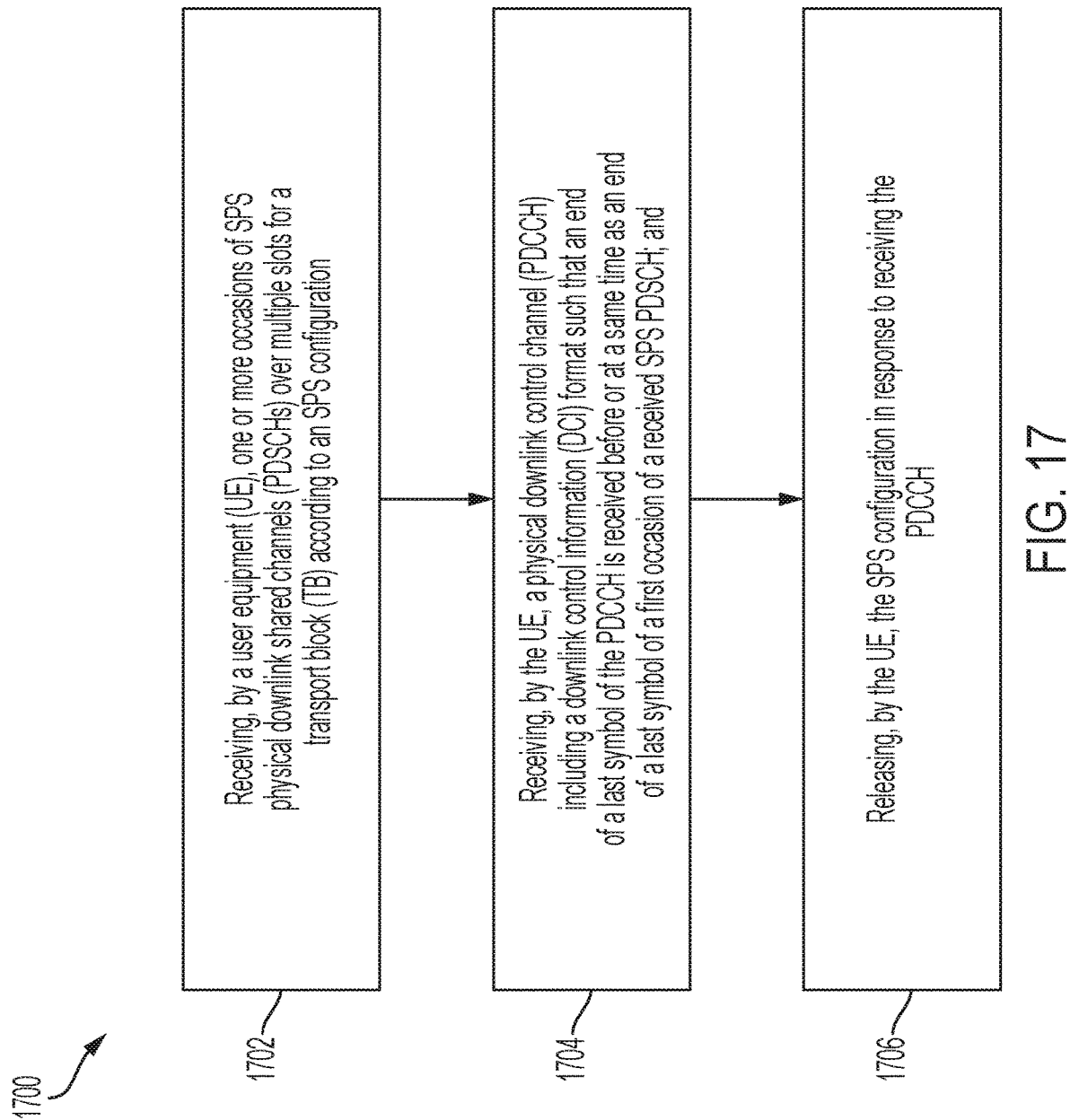
FIG. 17 illustrates a flowchart of semi-persistently scheduled (SPS) release, according to some embodiments.

FIG. 17 illustrates a flowchart 1700 of semi-persistently scheduled (SPS) release according to several embodiments. At step 1702, a UE receives one or more occasions of SPS physical downlink shared channels (PDSCHs) over multiple slots for a transport block (TB) according to an SPS configuration. The UE may be configured via RRC with the SPS configuration. When activated by an activation DCI, the SPS configuration and the activation DCI may inform the UE of the resources for SPS PDSCH reception, e.g. symbols and slots for SPS PDSCH occasion.

At step 1704, the UE receives a physical downlink control channel (PDCCH) including a downlink control information (DCI) format such that an end of a last symbol of the PDCCH is received before or at a same time as an end of a last symbol of a first occasion of a received SPS PDSCH. A comparator, within the UE, may make the timing determination in step 1704. In some embodiments, the DCI format may indicate an SPS PDSCH release through the PDCCH reception. At step 1706, the UE releases the SPS configuration in response to receiving the PDCCH.

Figure 18:
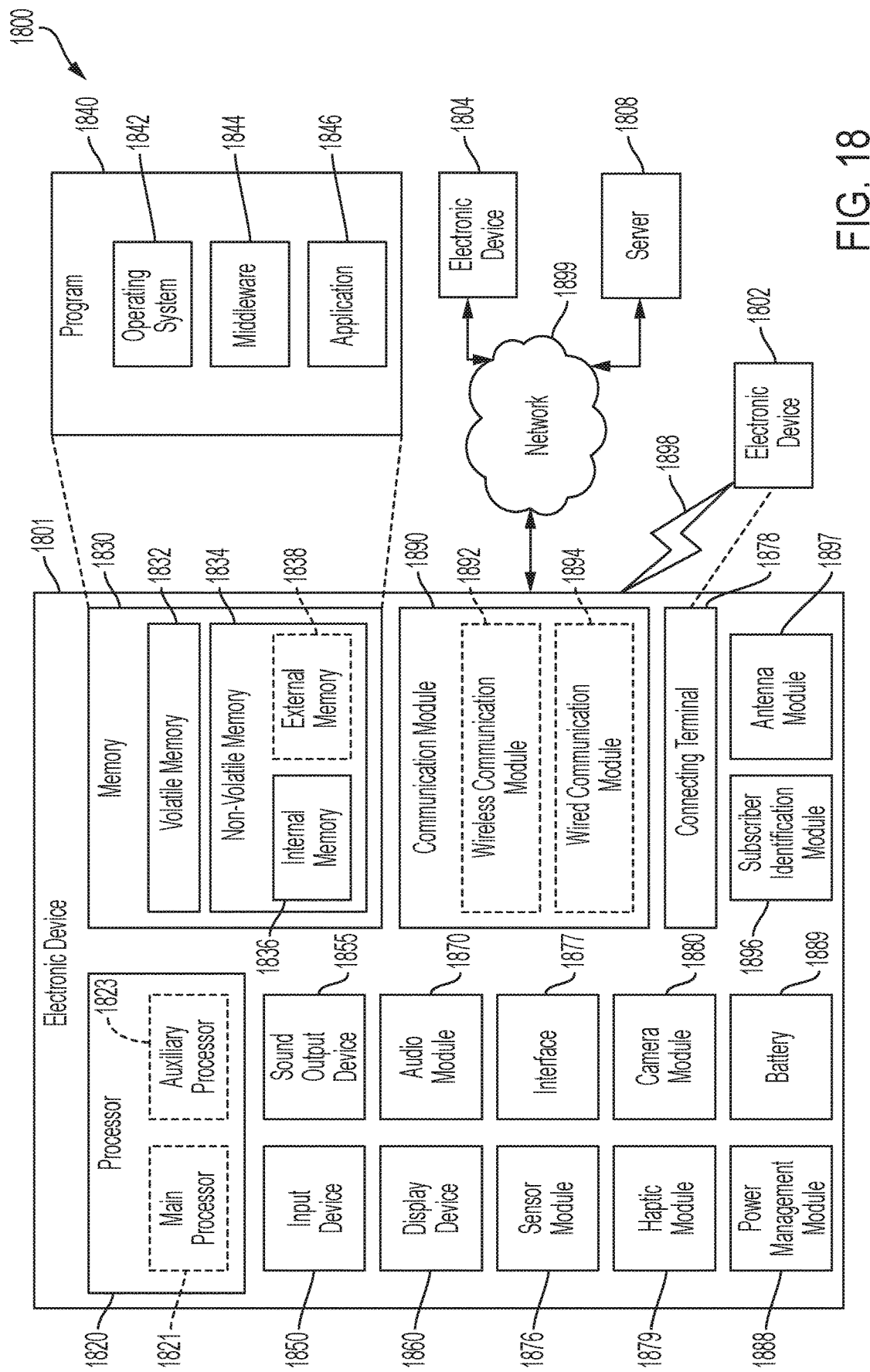
FIG. 18 illustrates a block diagram of an electronic device in a network environment, according to some embodiments.

FIG. 18 illustrates a block diagram of an electronic device 1801 in a network environment 1800, according to one embodiment. Referring to FIG. 18, the electronic device 1801 in the network environment 1800 may communicate with another electronic device 1802 via a first network 1898 (e.g., a short-range wireless communication network), or another electronic device 1804 or a server 1808 via a second network 1899 (e.g., a long-range wireless communication network). The electronic device 1801 may also communicate with the electronic device 1804 via the server 1808. The electronic device 1801 may include a processor 1820, a memory 1830, an input device 1850, a sound output device 1855, a display device 1860, an audio module 1870, a sensor module 1876, an interface 1877, a haptic module 1879, a camera module 1880, a power management module 1888, a battery 1889, a communication module 1890, a subscriber identification module (SIM) 1896, or an antenna module 1897. In one embodiment, at least one (e.g., the display device 1860 or the camera module 1880) of the components may be omitted from the electronic device 1801, or one or more other components may be added to the electronic device 1801. In one embodiment, some of the components may be implemented as a single integrated circuit (IC). For example, the sensor module 1876 (e.g., a fingerprint sensor, an iris sensor, or an illuminance sensor) may be embedded in the display device 1860 (e.g., a display).

The processor 1820 may execute, for example, software (e.g., a program 1840) to control at least one other component (e.g., a hardware or a software component) of the electronic device 1801 coupled with the processor 1820, and may perform various data processing or computations. As at least part of the data processing or computations, the processor 1820 may load a command or data received from another component (e.g., the sensor module 1876 or the communication module 1890) in volatile memory 1832, process the command or the data stored in the volatile memory 1832, and store resulting data in non-volatile memory 1834. The processor 1820 may include a main processor 1821 (e.g., a central processing unit (CPU) or an application processor (AP)), and an auxiliary processor 1823 (e.g., a graphics processing unit (GPU), an image signal processor (ISP), a sensor hub processor, or a communication processor (CP)) that may be operable independently from, or in conjunction with, the main processor 1821. Additionally or alternatively, the auxiliary processor 1823 may be adapted to consume less power than the main processor 1821, or execute a particular function. The auxiliary processor 1823 may be implemented as being separate from, or a part of, the main processor 1821.

The auxiliary processor 1823 may control at least some of the functions or states related to at least one component (e.g., the display device 1860, the sensor module 1876, or the communication module 1890) among the components of the electronic device 1801, instead of the main processor 1821 while the main processor 1821 may be in an inactive (e.g., sleep) state, or together with the main processor 1821 while the main processor 1821 may be in an active state (e.g., executing an application). According to one embodiment, the auxiliary processor 1823 (e.g., an image signal processor or a communication processor) may be implemented as part of another component (e.g., the camera module 1880 or the communication module 1890) functionally related to the auxiliary processor 1823.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input device 1850 may receive a command or data to be used by other component (e.g., the processor 1820) of the electronic device 1801, from the outside (e.g., a user) of the electronic device 1801. The input device 1850 may include, for example, a microphone, a mouse, or a keyboard.

The sound output device 1855 may output sound signals to the outside of the electronic device 1801. The sound output device 1855 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1860 may visually provide information to the outside (e.g., a user) of the electronic device 1801. The display device 1860 may include, for example, a display, a hologram device, or a projector and control circuitry to control a corresponding one of the display, hologram device, and projector. According to one embodiment, the display device 1860 may include touch circuitry adapted to detect a touch, or sensor circuitry (e.g., a pressure sensor) adapted to measure the intensity of force incurred by the touch.

The audio module 1870 may convert a sound into an electrical signal and vice versa. According to one embodiment, the audio module 1870 may obtain the sound via the input device 1850, or output the sound via the sound output device 1855 or a headphone of an external electronic device 1802 directly (e.g., wired) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. The sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device 1802 directly (e.g., wired) or wirelessly. According to one embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device 1802. According to one embodiment, the connecting terminal 1878 may include, for example, an HDMI connector, a USB connector, an SD card connector, or an audio connector (e.g., a headphone connector).

The haptic module 1879 may convert an electrical signal into a mechanical stimulus (e.g., a vibration or a movement) or an electrical stimulus that may be recognized by a user via tactile sensation or kinesthetic sensation. According to one embodiment, the haptic module 1879 may include, for example, a motor, a piezoelectric element, or an electrical stimulator.

The camera module 1880 may capture a still image or moving images. According to one embodiment, the camera module 1880 may include one or more lenses, image sensors, image signal processors, or flashes.

The power management module 1888 may manage power supplied to the electronic device 1801. The power management module 1888 may be implemented as at least part of, for example, a power management integrated circuit (PMIC).

The battery 1889 may supply power to at least one component of the electronic device 1801. According to one embodiment, the battery 1889 may include, for example, a primary cell that may be not rechargeable, a secondary cell that may be rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the AP) and supports a direct (e.g., wired) communication or a wireless communication. According to one embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth™, wireless-fidelity (Wi-Fi) direct, or a standard of the Infrared Data Association (IrDA)) or the second network 1899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The antenna module 1897 may transmit or receive a signal or power to or from the outside (e.g., the external electronic device) of the electronic device 1801. According to one embodiment, the antenna module 1897 may include one or more antennas, and, therefrom, at least one antenna appropriate for a communication scheme used in the communication network, such as the first network 1898 or the second network 1899, may be selected, for example, by the communication module 1890 (e.g., the wireless communication module 1892). The signal or the power may then be transmitted or received between the communication module 1890 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1801 and the external electronic device 1804 via the server 1808 coupled with the second network 1899. Each of the electronic devices 1802 and 1804 may be a device of a same type as, or a different type, from the electronic device 1801. All or some of operations to be executed at the electronic device 1801 may be executed at one or more of the external electronic devices 1802, 1804, or server 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the outcome, with or without further processing of the outcome, as at least part of a reply to the request. To that end, a cloud computing, distributed computing, or client-server computing technology may be used, for example.

One embodiment may be implemented as software (e.g., the program 1840) including one or more instructions that are stored in a storage medium (e.g., internal memory 1836 or external memory 1838) that may be readable by a machine (e.g., the electronic device 1801). For example, a processor of the electronic device 1801 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium may be a tangible device, and does not include a signal (e.g., an electromagnetic wave), but this term does not differentiate between where data may be semi-permanently stored in the storage medium and where the data may be temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of semi-persistently scheduled (SPS) release, the method comprising:
receiving, by a user equipment (UE), one or more occasions of SPS physical downlink shared channels (PDSCHs) over multiple slots for a transport block (TB) according to an SPS configuration;
receiving, by the UE, a physical downlink control channel (PDCCH) including a downlink control information (DCI) format such that an end of a last symbol of the PDCCH is received before or at a same time as an end of a last symbol of a first occasion of a received SPS PDSCH; and
releasing, by the UE, the SPS configuration in response to receiving the PDCCH and based on the PDCCH including a first index value that indicates the SPS configuration, the PDCCH including a second index value, different from the first index value, that indicates a second SPS configuration for release, wherein the PDCCH includes the first index value and the second index value based on a priority of the SPS configuration matching a priority of the second SPS configuration.

2. The method of claim 1, wherein the PDCCH indicates a release of the SPS PDSCHs.

3. The method of claim 1, wherein the PDSCH is configured with an aggregation factor (AF), wherein AF≥1 on a PDSCH cell.

4. The method of claim 1, wherein the PDSCH is configured with an aggregation factor (AF), wherein AF=1 on a PDSCH cell.

5. The method of claim 1, wherein the UE stops PDSCH decoding and does not generate HARQ-ACK feedback information for the received occasions of SPS PDSCHs.

6. The method of claim 1, wherein an acknowledgment or no-acknowledgment (A/N) of the PDCCH and an A/N of the SPS PDSCH are mapped to a same physical uplink control channel (PUCCH).

7. The method of claim 1, wherein the UE receives the PDCCH before an end of the SPS PDSCH occasions among repetitions.

8. A system for semi-persistently scheduled (SPS) release, the system comprising:
at least one memory; and
a processor coupled to the memory, the processor configured to:
receive one or more occasions of SPS physical downlink shared channels (PDSCHs) over multiple slots for a transport block (TB) according to an SPS configuration;
receive a physical downlink control channel (PDCCH) including a downlink control information (DCI) format such that an end of a last symbol of the PDCCH is received before or at a same time as an end of a last symbol of a first occasion of a received SPS PDSCH; and
release the SPS configuration in response to receiving the PDCCH and based on the PDCCH including a first index value that indicates the SPS configuration, the PDCCH including a second index value, different from the first index value, that indicates a second SPS configuration for release, wherein the PDCCH includes the first index value and the second index value based on a priority of the SPS configuration matching a priority of the second SPS configuration.

9. The system of claim 8, wherein the PDCCH indicates a release of the SPS PDSCH.

10. The system of claim 8, wherein the PDSCH is configured with an aggregation factor (AF), wherein AF≥1 on a PDSCH cell.

11. The system of claim 8, wherein the PDSCH is configured with an aggregation factor (AF), wherein AF=1 on a PDSCH cell.

12. The system of claim 8, wherein the processor is further configured to stop PDSCH decoding and not generate HARQ-ACK feedback information for the received occasions of SPS PDSCHs.

13. The system of claim 8, wherein an acknowledgment or no-acknowledgment (A/N) of the PDCCH and an A/N of the SPS PDSCH are mapped to a same physical uplink control channel (PUCCH).

14. The system of claim 8, wherein the PDCCH is received before an end of the SPS PDSCH occasions among repetitions.

15. A user equipment (UE) configured for semi-persistently scheduled (SPS) release, the UE comprising:
a receiver configured to:
receive one or more occasions of SPS physical downlink shared channels (PDSCHs) over multiple slots for a transport block (TB) according to an SPS configuration,
receive a physical downlink control channel (PDCCH) including a downlink control information (DCI) format such that an end of a last symbol of the PDCCH is received before or at a same time as an end of a last symbol of a first occasion of a received SPS PDSCH, and
release the SPS configuration in response to receiving the PDCCH and based on the PDCCH including a first index value that indicates the SPS configuration, the PDCCH including a second index value, different from the first index value, that indicates a second SPS configuration for release, wherein the PDCCH includes the first index value and the second index value based on a priority of the SPS configuration matching a priority of the second SPS configuration.

16. The UE of claim 15, wherein:
the PDCCH indicates a release of the SPS PDSCH; and
the UE receives the PDCCH before an end of the SPS PDSCH occasions among repetitions.

17. The UE of claim 15, wherein the PDSCH is configured with an aggregation factor (AF), wherein AF≥1 on a PDSCH cell.

18. The UE of claim 15, wherein the PDSCH is configured with an aggregation factor (AF), wherein AF=1 on a PDSCH cell.

19. The UE of claim 15, wherein the UE stops a PDSCH decoding and does not generate HARQ-ACK feedback information for the received occasions of SPS PDSCHs.

20. The UE of claim 15, wherein an acknowledgment or no-acknowledgment (A/N) of the PDCCH and an A/N of the SPS PDSCH are mapped to a same physical uplink control channel (PUCCH).

* * * * *